(12) United States Patent
Wang et al.

(10) Patent No.: US 6,901,048 B1
(45) Date of Patent: May 31, 2005

(54) LINK-LEVEL PROTECTION OF TRAFFIC IN A PACKET-SWITCHED NETWORK

(75) Inventors: Guo Qiang Q. Wang, Nepean (CA); Kent E. Felske, Kanata (CA); Wenfeng Chen, Kanata (CA); Chenjiang Hu, Nepean (CA); Liangyu L. Jia, Kanata (CA)

(73) Assignee: Nortel Networks Limited (CA)

( * ) Notice: Subject to any disclaimer, the term of this patent is extended or adjusted under 35 U.S.C. 154(b) by 981 days.

(21) Appl. No.: 09/603,355

(22) Filed: Jun. 26, 2000

Related U.S. Application Data

(63) Continuation-in-part of application No. 09/378,141, filed on Aug. 20, 1999, now Pat. No. 6,535,481.

(51) Int. Cl.[7] .............................................. G01R 31/08
(52) U.S. Cl. ........................ 370/228; 370/216; 370/220
(58) Field of Search ................................ 370/216–220, 370/222, 223, 225, 227, 228, 242, 244, 247, 248, 250, 251, 226

(56) References Cited

U.S. PATENT DOCUMENTS

| | | | | |
|---|---|---|---|---|
| 5,850,505 A | | 12/1998 | Grover et al. | 395/182.02 |
| 5,870,382 A | * | 2/1999 | Tounai et al. | 370/220 |
| 6,163,525 A | * | 12/2000 | Bentall et al. | 370/227 |
| 6,456,626 B1 | * | 9/2002 | Whiting et al. | 370/409 |
| 6,512,740 B1 | * | 1/2003 | Baniewicz et al. | 370/216 |
| 6,549,513 B1 | * | 4/2003 | Chao et al. | 370/227 |
| 6,643,254 B1 | * | 11/2003 | Kajitani et al. | 370/217 |

* cited by examiner

*Primary Examiner*—Phirin Sam
(74) *Attorney, Agent, or Firm*—Steubing McGuiness & Manoras LLP

(57) ABSTRACT

In a packet-switched network having a plurality of nodes interconnected by links, pre-defined protection paths provide protection of a selected plurality of links. Adjacent nodes connected by a protected link are adapted to detect a failure of the protected link, to encapsulate packets within tunnel packets, to differentiate between tunnel packets and non-tunnel packets and to exchange the tunnel packets via a protection path rather than via the failed link. This results in faster automatic protection switching of packet-based traffic. The invention is particularly suited to an Internet Protocol network.

36 Claims, 18 Drawing Sheets

LINK-LEVEL PROTECTION OF TRAFFIC IN A PACKET-SWITCHED NETWORK

CROSS-REFERENCES TO RELATED APPLICATIONS

This is a continuation-in-part of U.S. patent application Ser. No. 09/378,141, filed Aug. 20, 1999, now U.S. Pat. No. 6,535,481, entitled "Network Data Routing Protection Cycles for Automatic Protection Switching", assigned to the assignee of the present invention and incorporated by reference herein in its entirety.

FIELD OF THE INVENTION

The present invention relates to computer networks, and more specifically to a computer network that provides automatic protection switching to re-route data packets in the event of a network link failure.

BACKGROUND OF THE INVENTION

In an Internet Protocol (IP) based computer network, data routing algorithms such as Open Shortest Path First (OSPF), Intermediate System-Intermediate System (IS—IS), and Routing Information Protocol (RIP) are used to determine the path that data packets travel through the network. When a link between two network routers fails, the routing algorithms are used to advertise the failure throughout the network.

Most routers can detect a local link failure relatively quickly, but it takes the network as a whole a much longer time to converge. This convergence time is typically on the order of 10–60 seconds depending on the routing algorithm and the size of the network. Eventually, all of the involved routers learn of the link failure and compute new routes for data packets to affected destinations. Once all the routers converge on a new set of routes, data packet forwarding proceeds normally.

Routing algorithms such as OSPF are dependent on the topology of the network, based upon which each node computes the "next hop" routing segment for a packet having a particular source-destination pair. The combined next hop computations of the various nodes in the network result in an end-to-end route being defined for each source-destination pair through multiple nodes. However, traffic considerations within the network are not taken into account by routing algorithms such as OSPF. Thus, although a small number of hops may exist between a particular source node and a particular destination node, the travel time of a packet emitted by the source node will depend strongly on the extent to which the resources of the intermediate links are busy processing traffic.

As a result, packets may experience a long, variable and unpredictable delay as they travel from source to destination. This property is inherent to the dynamic routing characteristics of OSPF and other routing algorithms and is known as "best effort" traffic delivery. The variability and unpredictability of the delay experienced by a packet are even worse following the occurrence of a link failure at some point along the route defined by the next hop information in each intermediate node. In order to recover from the failure, the nodes at either end of the failed link must detect the failure and update their next hop information in order to bypass the failed link.

Typically, some intermediate nodes not located on the original route from source to destination will suddenly become next hops in the alternate route intended to bypass the failed link. This not only forces such new intermediate nodes to spend time computing a set of next hops but also increases the amount of traffic passing through the new intermediate nodes.

The time taken by a node to detect a failure is known as the "detection time" and the time taken by all nodes to converge to an alternate route is known as the "hold-down time". These times will vary according to the routing algorithm used. In the case of the OSPF routing algorithm, the detection time is at least 0.05 seconds and the hold-down time is at least as long as 2 seconds. In general, therefore, it is impossible to recover from failure of a link before at least 2.05 seconds have elapsed. This minimum overall delay does not even take into consideration the additional delay due to congestion at the nodes or links encountered in the alternate path. Thus, the resulting delay will be on the order of seconds, which is intolerable as far as voice, video, medical or other mission-critical communications are concerned.

Furthermore, the choice of an alternate route may affect the reliability, speed and availability of virtual private networks (VPNs) already established by an Internet service provider (ISP) and paid for by its customers. To maintain customer satisfaction, the ISP may have to provide higher capacity equipment in order to handle any potential increase in traffic in the event of a failure. Due to the mesh architecture of the Internet, the ISP cannot pinpoint where a traffic increase is liable to occur and thus it may have to upgrade all the equipment in the region it serves. Clearly, this requires an added investment by the ISP in terms of high-capacity routers and transport equipment.

Moreover, while the network is converging after a link fails, transient loops can occur which consume valuable bandwidth. Loop prevention algorithms have been proposed to eliminate such transient loops. When using these algorithms, routes are pinned until the network has converged and the new routes have been proven to be loop-free. Although loop prevention algorithms have the advantage that data packets flowing on unaffected routes are not disrupted while transient loops are eliminated, their main drawback is that data packets directed out of a failed link get lost, or "black holed," during the convergence process. Loop prevention algorithms also extend the convergence time somewhat while new routes are being verified to be loop-free.

Clearly, the industry is in need of a protection switching mechanism that is sufficiently fast to prevent the loss of high-priority traffic ordinarily travelling through one or more failed links, without unpredictably overloading the remaining operational links during a protection mode.

SUMMARY OF THE INVENTION

It would therefore be desirable to provide a method and router for routing packets which would result in faster automatic protection switching of traffic which ordinarily travels across a link that has recently been found to have failed. It would also be an advantage to reduce the variability in the delay taken by the protected traffic once automatic protection switching has been initiated.

The present invention allows these features and advantages to be achieved through the use of datagram encapsulation in combination with the concept of protection paths (or protection cycles or "p-cycles") in a packet-switched environment. Each protection path consists of a closed loop passing through nodes and across links in the network. Links which are part of the protection paths or links whose end nodes are part of a given protection path are said to be protected by that protection path.

When failure of a protected link is detected by a node adjacent to that protected link, a tunnel is established between the end nodes of the link. That is to say, datagrams which would ordinarily be transmitted across the failed link are encapsulated within the bodies of larger datagrams that are transmitted across the protection path. The various nodes in the network are adapted to distinguish between so-called "tunnel" datagrams and "non-tunnel" datagrams.

Because the protection path can be pre-defined, the main consumption of time is in the detection of the fault and the establishment of a tunnel, both of which can be done at a sufficiently low layer to allow ring-like protection speeds in a mesh network.

Thus, the present invention can be summarized according to a first broad aspect as a method of routing packets intended to be transmitted across a network link protected by a protection path defined by a closed loop of nodes and links through the network. The method includes determining whether the protected link has failed and, if the protected link has not failed, sending the packets across the protected link; otherwise, encapsulating the packets within tunnel packets and sending the tunnel packets along the protection path.

According to a second broad aspect, the invention may be summarized as a method including the steps of determining the destination node associated with a received packet and determining whether the received packet is a tunnel packet encapsulating another packet within its body. There are four possible cases. Firstly, if the destination node associated with the received packet is the current node and if the received packet is not a tunnel packet, the node processes the received packet without further forwarding.

Secondly, if the destination node associated with the received packet is not the current node and if the received packet is not a tunnel packet, the node forwards the received packet based on the destination node associated with the received packet. Thirdly, if the destination node associated with the received packet is the current node and if the received packet is a tunnel packet, the node retrieves the encapsulated packet from the received packet and forwards it based on the destination node associated with the encapsulated packet. Finally, if the destination node associated with the received packet is not the current node and if the received packet is a tunnel packet, the node determines the identity of a protection path along which the tunnel packet was received and forwards the received packet along a next link in that protection path.

The invention may be summarized according to a third broad aspect as a method of switching traffic in a packet-switched network, including the steps of responding to detection of a failure of a link connecting a pair of adjacent nodes by encapsulating packets within the bodies of tunnel packets and forwarding the tunnel packets along a pre-defined protection path which bypasses the failed link.

Also within the scope of the invention are articles of manufacture comprising computer readable media as well as routers designed to implement these methods.

According to another broad aspect, the invention may be summarized as a protection cycle manager that processes data packets in the event of a failure of a link connected to a routing node. The protection cycle manager includes a packet identifier that identifies, as protection cycle packets, data packets having a specific protection cycle format that includes a packet source and a packet destination and an indication that the packet is a protection cycle packet.

The protection cycle manager also includes a packet processor that processes each protection cycle packet to determine whether the packet destination corresponds to the routing node, and:

i. if the packet destination corresponds to the routing node, the protection cycle packet is treated by the routing node as a data packet received from the packet source via the failed link; and ii. if the packet destination does not correspond to the routing node, the protection cycle packet is sent to a protection cycle node associated with the routing node.

BRIEF DESCRIPTION OF THE DRAWINGS

These and other aspects and features of the present invention will now become apparent to those of ordinary skill in the art upon review of the accompanying description of specific embodiments of the invention in conjunction with the accompanying drawings, in which.

DETAILED DESCRIPTION OF THE PREFERRED EMBODIMENTS

One embodiment of the present invention uses Multi-Protocol Label Switching (MPLS) with explicit routing to establish an MPLS layer protection cycle (p-cycle) that provides automatic protection switching to reroute data packets in the event of a network link failure. Another embodiment of the invention establishes an IP-layer p-cycle through the use of tunneling of Internet Protocol (IP) datagrams with static routing.

In the MPLS embodiment, an MPLS Label Switched Path (LSP) tunnel passes through the end points of the link that will be protected. In the IP embodiment, an IP-in-IP tunnel passes through the end points of the link that will be protected. The tunnel established in either case way forms a p-cycle through which failed-link packets are directed.

A given p-cycle may protect one or multiple links. In either case, the p-cycle may be configured by hand, or automatically established using network link state and topology information derived from a routing algorithm, such as Open Shortest Path First (OSPF). Various algorithms may be used to automatically compute the specific structure of a given p-cycle. An embodiment of the invention uses a network management application for this purpose since the p-cycle will not follow an optimal path. When a p-cycle is bi-directional, a bandwidth protection mechanism may be implemented so that some of the p-cycle traffic goes one way, and the rest the other way.

Figure 1:
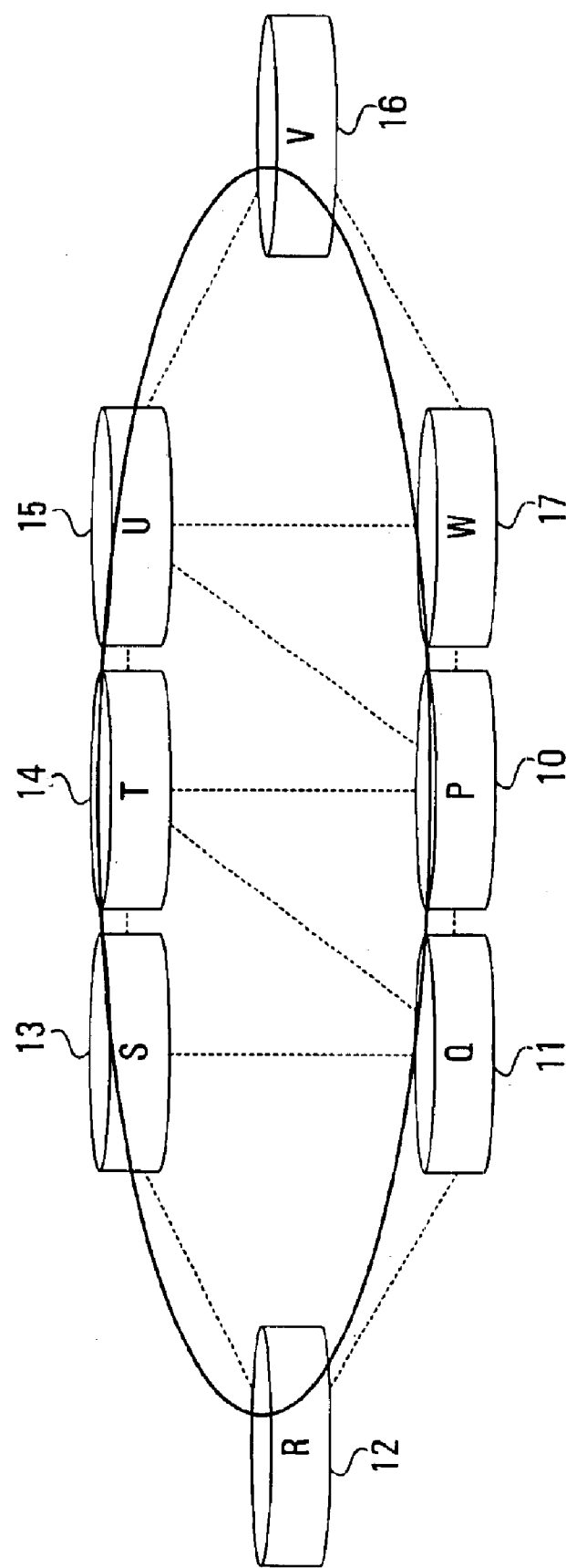
FIG. 1 shows a computer network which uses MPLS protection cycles to achieve automatic protection switching, according to an embodiment of the invention.

FIG. 1 is an illustration of a computer network that uses an embodiment of the present invention employing MPLS p-cycle automatic protection switching. In FIG. 1, network nodes P 10 through W 17 are normally linked via the dashed lines to route data packets from node to node. In the network segment shown, the normal network links between P and I, P and U, Q and S, Q and T and W and U are also protected by a p-cycle 18. The p-cycle 18 forms a loop through the network so that a packet sent through the p-cycle will eventually come back to its origination node if not taken out of the p-cycle by one of the nodes it passes through. In FIG. 1, LSP p-cycle 18 traverses the network segment from node P 10 to Q 11 to R 12 . . . to V 16 to W 17 and back to P 10.

Only one p-cycle 18 is shown in FIG. 1. In practice, a p-cycle is established for every set of links to be protected. An embodiment of the invention can operate successfully in any arbitrary network topology. It should be noted, however, that to realize full link-level protection, for every two neighbours X and Y connected by link L in the network, another network path between X and Y must exist that does not include L.

Various options may be employed with respect to network-level encapsulation on the original link. For example, in one embodiment, MPLS is used on the original link and thus the labeled packet may be tunneled on the backup link using MPLS label stacking. In another embodiment of the invention described in more detail herein below, IP encapsulation is used. In any vent, multiple independent link failures may be tolerated using multiple layers of tunneling.

With continued reference to FIG. 1, the router for each node monitors its own local links. When a link failure is detected, the router for an affected node quickly routes the data packet traffic over to the p-cycle 18. Then, the network routing algorithm advertises the link failure so that the network can be re-routed without the failed link, and a loop-prevention mechanism determines that the re-routed network is loop-free. Packet traffic may then be switched to the re-routed network and new p-cycles recalculated as necessary.

Figure 12:
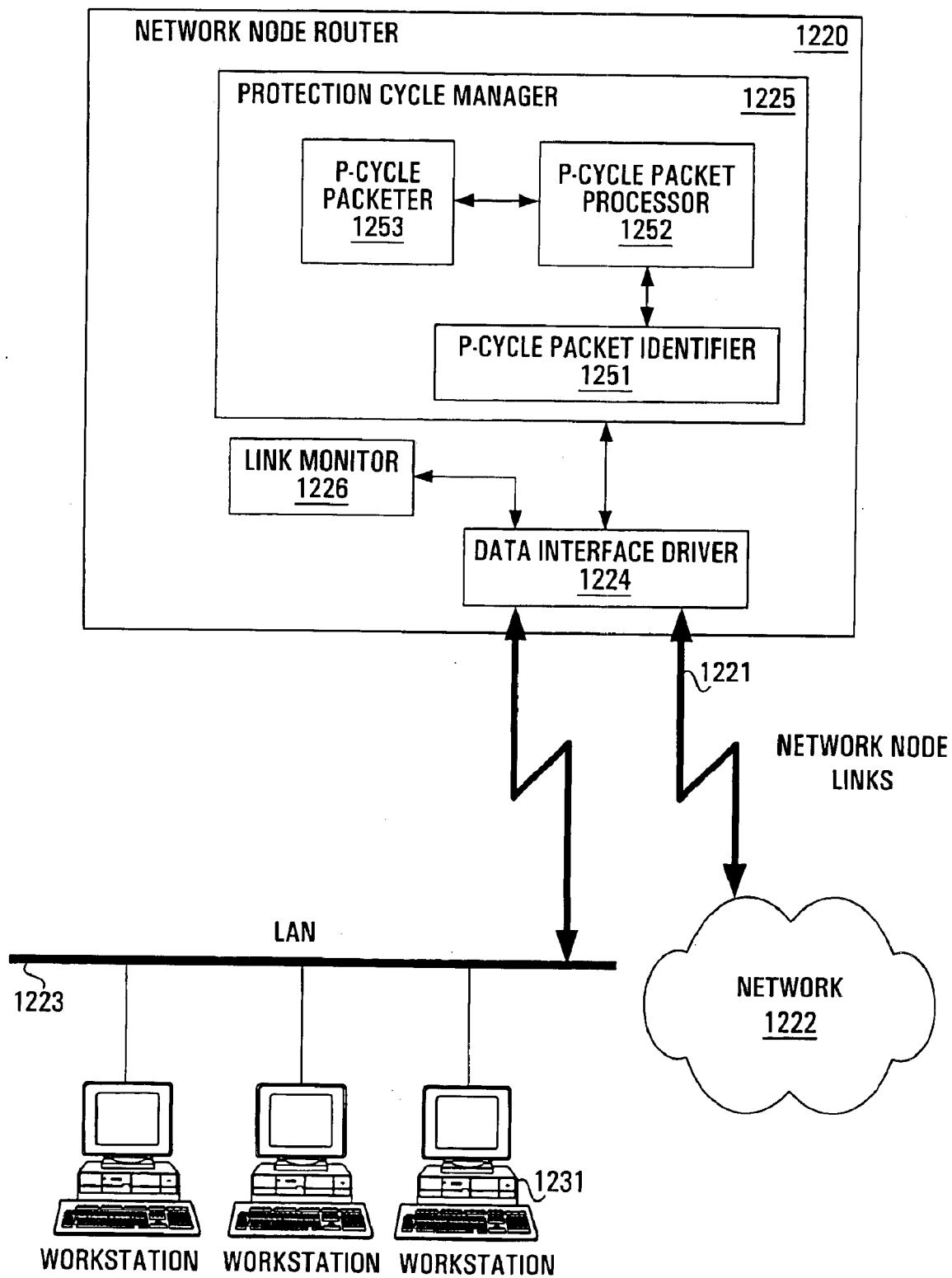
FIG. 12 shows a network node router which supports protection cycles according to an embodiment of the invention.

FIG. 12 is an illustration of a network node router which supports p-cycles according to an embodiment of the invention. Network node router 1220 is a part of a computer network 1222 of routers in mutual communication via a plurality of network node data links 1221. Router 1220 also serves to connect one or more local area networks (LANs) 1223 having one or more workstations 1231. Data packets enter and exit the router 1220 as controlled by a data interface driver 1224 which is connected to the network node links 1221.

Figure 13:
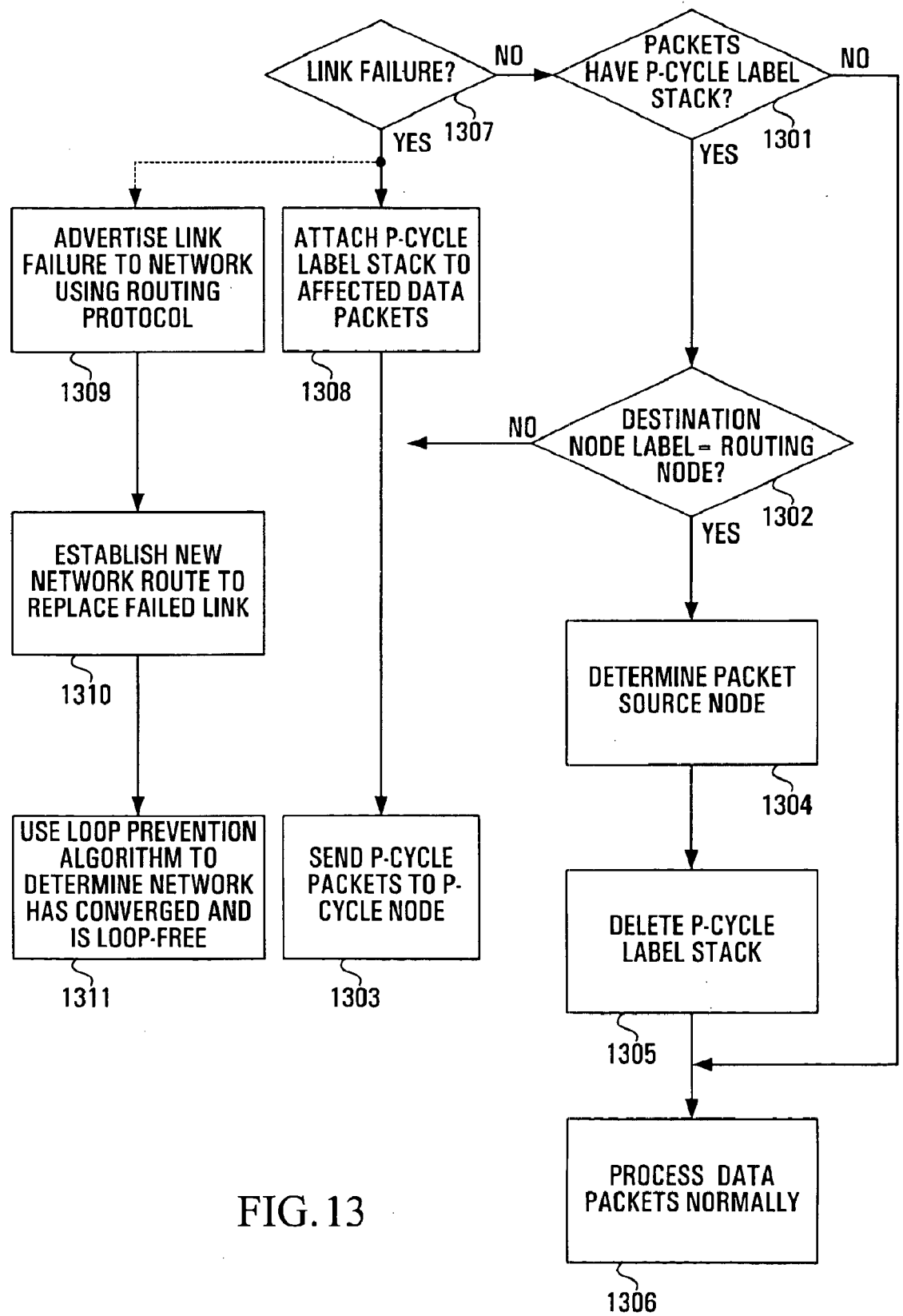
FIG. 13 is a flow chart illustrating the logical steps in a method of providing automatic protection switching according to an embodiment of the invention.

FIG. 13 is a flow chart illustration of the logical steps in a corresponding method of providing automatic protection switching according to an embodiment of the invention. A protection cycle manager (PCM) 1225 includes a p-cycle packet identifier 1251 that, in STEP 1301, identifies as p-cycle packets, data packets that have a p-cycle label stack, which, in a one embodiment, is a standard MPLS label stack. In such an embodiment, the top label in the stack indicates the next node in the p-cycle, the next label on the stack is the identity of the destination node that ultimately receives the packet and the third label in the stack is the identity of the node creating the label stack.

Identified p-cycle packets are processed by p-cycle packet processor 1252 which, in STEP 1302, pops the topmost label off the label stack and checks the next label to see if the router node's own identity is in the destination node position in the label stack. If not, the label for the next p-cycle node is pushed onto the stack and the packet is sent by the data interface driver 1224 via the node link 1221 to the next node on the p-cycle, STEP 1303.

If, in STEP 1302, the router node's own identity is carried in the destination node position in the label stack, the source node label in the label stack is checked to determine which network link the packet normally would have used, STEP 1304. The p-cycle label stack is then deleted, STEP 1305, and thereafter, the packet is treated as if it had been received via the normal network link 1221 from the source node, STEP 1306.

In one embodiment, the network node router also includes a network link monitor 1226 in communication with the data interface driver 1224. When the link monitor 1226 detects a failed link, STEP 1307, protection cycle packeter 1253 attaches to affected data packets a p-cycle label stack having appropriate labels for source node, destination node, and p-cycle node, STEP 1308, and the p-cycle packets are then sent to the p-cycle node for that router, STEP 1303.

A link failure also is advertised to the network using the routing algorithm, STEP 1309. A new network route is then established to replace the failed link, STEP 1310, and a loop prevention algorithm is used to determine that the new network routes have converged and are loop-free, STEP 1311.

A diffusion-based loop prevention algorithm as is known in the art may be used to detect when the network has converged so that it is safe to switch to the new routes. Such diffusion algorithms are discussed, for example, in Garcia-Lunes-Aceves, J. J., "Loop-Free Routing Using Diffusing Computations," IEEE/ACM Transactions on Networking, vol. 1, no. 1, 1993, pp. 130–141, which is hereby incorporated herein by reference. Using p-cycles with a loop prevention algorithm allows for uninterrupted service in the event of a link failure without black holing of packets on the failed link.

Another embodiment of the invention is now described with reference to FIG. 2A, wherein is shown a network having a plurality of nodes 1, 2, 3, 4, 5 interconnected by links A, B, C, D, E, F, G, H, I. Node 1 is connected to node 2 by link A, to node 4 by link B and to node 5 by link C; node 2 is connected to node 3 by link D, to node 4 by link E and to node 5 by link F; node 3 is connected to node 5 by link G and to node 4 by link H; and node 4 is connected to node 5 by link I. The links A–I can be physical links (e.g., optical fibers, coaxial cables, twisted pairs, radio links) or logical links (e.g., SONET STS paths or ATM virtual channel connections). The links A–I could be uni-directional or bi-directional.

Figure 2A:
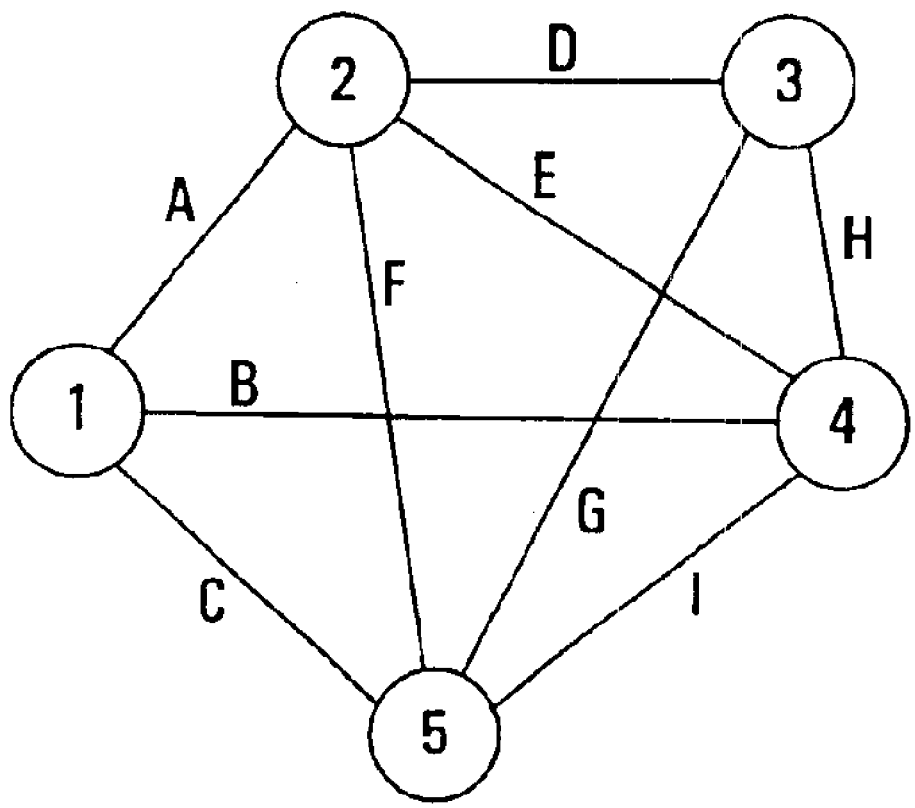
FIG. 2A shows, in schematic form, a network consisting of a plurality of nodes 1–5 interconnected by links A–I.

The network of FIG. 2A could be an Internet Protocol (IP) network, in which case the various nodes in the network are responsible for producing, forwarding and/or processing IP datagrams. However, the invention is not limited to IP networks and is applicable to any type of packet-switched network which involves the transmission of datagrams.

Each node is equipped with a memory as well as circuitry, control logic or software for routing produced or received datagrams in accordance with the contents of a routing table. The routing table used by a particular node can be stored in the node's memory. The routing table is specific to that node and indicates the link across which that node should forward a datagram, for each combination of source and destination address.

In simple cases, the routing table could be entered into memory in a manual fashion by an operator. Alternatively, the routing table associated with a particular node could be downloaded from a network administration server, which could be connected to the network and may have its own address. In still other embodiments, the routing table used at each node is computed and updated by the node itself. For example, a distributed routing algorithm may be run by all nodes in parallel in order to determine the next link over which a produced or received datagram should be forwarded.

A suitable routing algorithm is the open shortest path first (OSPF) algorithm described in J. Moy, "Network Working Group Request for Comments RFC1583, OSPF Version 2", March 1994, which can be found on line at http://www.cis.ohiostate.edu/htbin/rfc/rfc1583.html and which is incorporated by reference herein. The OSPF algorithm requires each node to collect and process network topology information, such as the identity of each node and that of its direct neighbours. A higher layer protocol may be used for gathering such information at each node and for distributing it throughout the network.

Figure 2B:
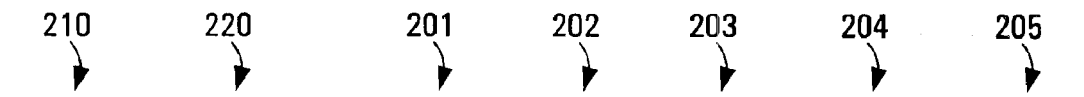
FIG. 2B is an example of routing tables used by the nodes in FIG. 2A to route received datagrams and locally generated datagrams.

With reference now to FIG. 2B, there is shown a master routing table which could be used by nodes 1, 2, 3, 4, 5 in order to route datagrams in the network of FIG. 2A. A single master routing table is illustrated in order to capture routing information pertaining to all 5 nodes in the network of FIG. 2A. However, the actual routing table stored within a particular one of the nodes 1–5 might consist of the source and destination node columns 210, 220 and a single one of the "next hop" columns 201–205.

While the contents of the next hop columns 201–205 can be obtained by inspection, as in this case, those skilled in the art will appreciate that a similar set of tables could be obtained by running a routing algorithm at each of the nodes. Thus, node 1 could be responsible for computing column 201, node 2 could compute column 202, etc.

The entry in a given row in column 201 specifies the link on which node 1 is to forward a produced or received datagram having a SOURCE field which matches the corresponding entry in column 210 and having a DESTINATION field which matches the corresponding entry in column 220. An identical rule applies to next hop columns 202–205 and nodes 2 through 5, respectively. For instance, if node 4 produces or receives a datagram with node 1 as the source and node 2 as the destination, then node 4 would forward this datagram directly to node 2 across link E.

It is noted that some entries in the next hop columns 201–205 are marked "process". Specifically, a "process" entry in next hop column 20x (corresponding to node x) appears whenever the destination node is node x, regardless of the source node. In other words, a node which receives a datagram destined for itself must "process" the datagram. As will be described in further detail herein below, the nature of the "process" operation depends on whether or not the received datagram is a so-called "original" datagram (which does not encapsulate another datagram in its body) or a so-called "tunnel" datagram (which does encapsulate another datagram in its body).

Figure 11A:
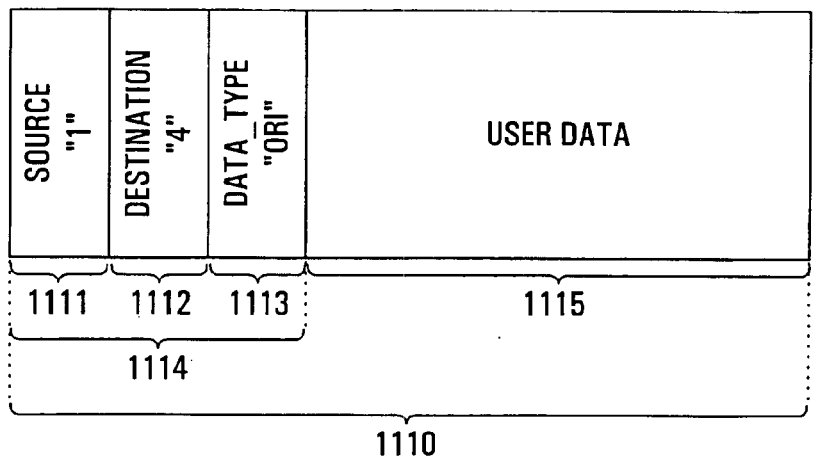
FIG. 11A is a schematic representation of an original (non-encapsulated) datagram.
Figure 11B:
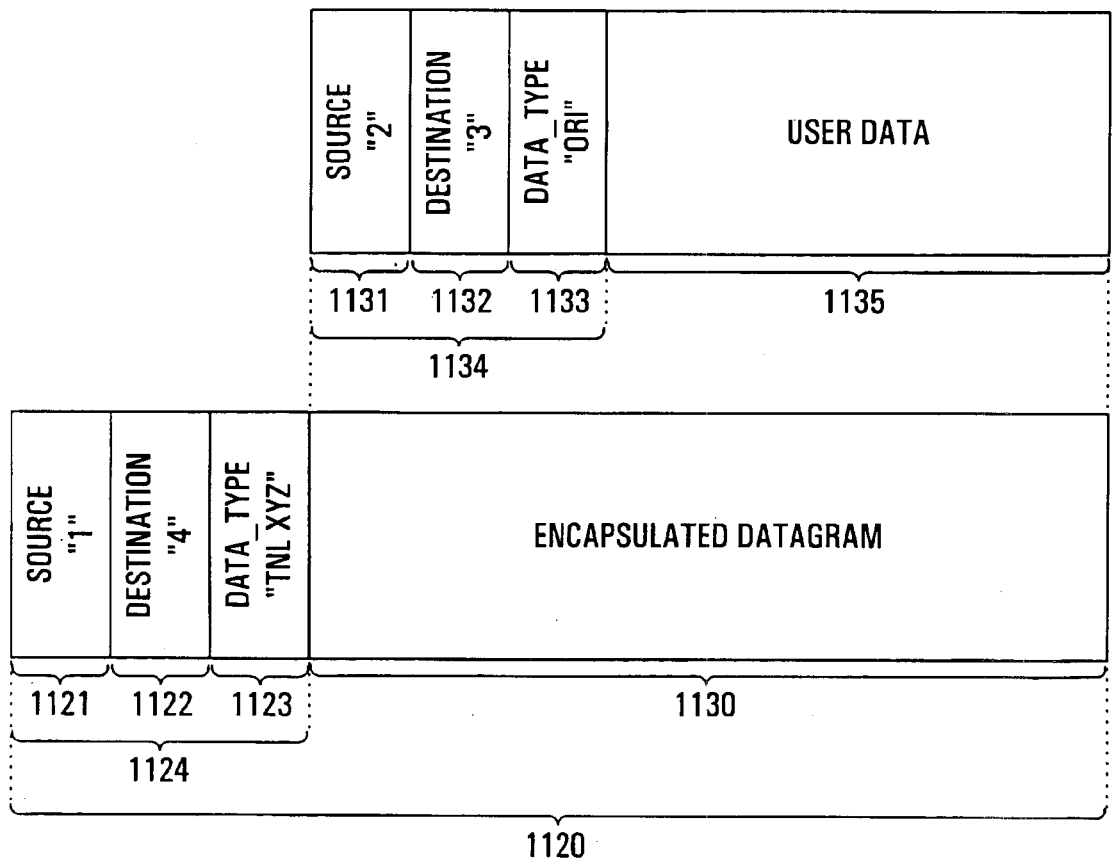
FIG. 11B is a schematic representation of an encapsulated datagram also known as a tunnel datagram.

An explanation of these two types of datagrams is now provided with reference to FIGS. 11A and 11B. Firstly, it is to be understood that both types of datagrams comprise a header and a body. The body contains data that is to be transferred from a source node to a destination node. The header contains information such as the identity of the source and destination nodes associated with the datagram. A common way of identifying a node is by means of an IP address associated with the node. The header also specifies the length of the body and contains information on the format of the data carried in the body. For example, the data carried in the body may be pure user data (an "original" datagram) or it may consist of another datagram with its own header and body (a "tunnel" datagram).

FIG. 11A shows an "original" datagram 1110 having a header 1114 and a body 1115, where the body 1115 contains pure user data. The header 1114 has a SOURCE field 1111 (wherein the source node is specified as being node 1) and a DESTINATION field 1112 (wherein the destination node is specified as being node 4). The header 1114 also contains a DATA_TYPE field 1113 which contains a code (shown as "ORI") indicative of the fact that the datagram 1110 is a "original" datagram with pure user data in its body 1115. In an IP datagram, this code is referred to as the "protocol type" which indicates whether the packet in question is a original packet or a tunnel packet.

FIG. 11B shows a "tunnel" datagram 1120 which also has a header 1124 and a body 1130 but in this case the body 1130 encapsulates another complete datagram. The header 1124 of the datagram 1120 has a SOURCE field 1121 and a DESTINATION field 1122 which contain the appropriate information with respect to datagram 1120. The header 1124 has a DATA_TYPE field 1123 which is marked "TNL XYZ", signifying that the body 1130 of the datagram 1120 contains an encapsulated datagram which is meant to travel along a logical "tunnel" with an identifier XYZ. The concept of a tunnel will be described in further detail herein below.

The IP datagram 1130 encapsulated within the body 1115 of datagram 1120 has its own header 1134 and body 1135. The header 1134 has a SOURCE field 1131 and a DESTINATION field 1132, as well as a DATA_TYPE field 1133. The SOURCE field 1131 and the DESTINATION field 1132 in datagram 1130 are exclusively related to datagram 1130 and are independent of the SOURCE field 1121 and the DESTINATION field 1122 in datagram 1120. In the illustrated example, the body 1135 of datagram 1130 contains pure user data and therefore the DATA_TYPE field 1133 contains the same code ("ORI") as the DATA_TYPE field 1113 in datagram 1110. It is to be understood, however, that the body 1135 of the encapsulated datagram 1130 could itself encapsulate another datagram, and so on, in a nested fashion.

The present invention provides a way of protecting traffic that travels along a set of links in a mesh network such as the network of FIG. 2A. This is enabled by first defining a set of protection cycles (p-cycles) in the network. A p-cycle can be viewed as a closed loop around three or more connected nodes in the network and effectively presents an alternate path for a set of links requiring protection. The set of protected links is defined by the configuration of the p-cycle in the sense that it includes (i) all the links forming the p-cycle itself and (ii) all the links whose end nodes are part of the same p-cycle.

Figure 3:
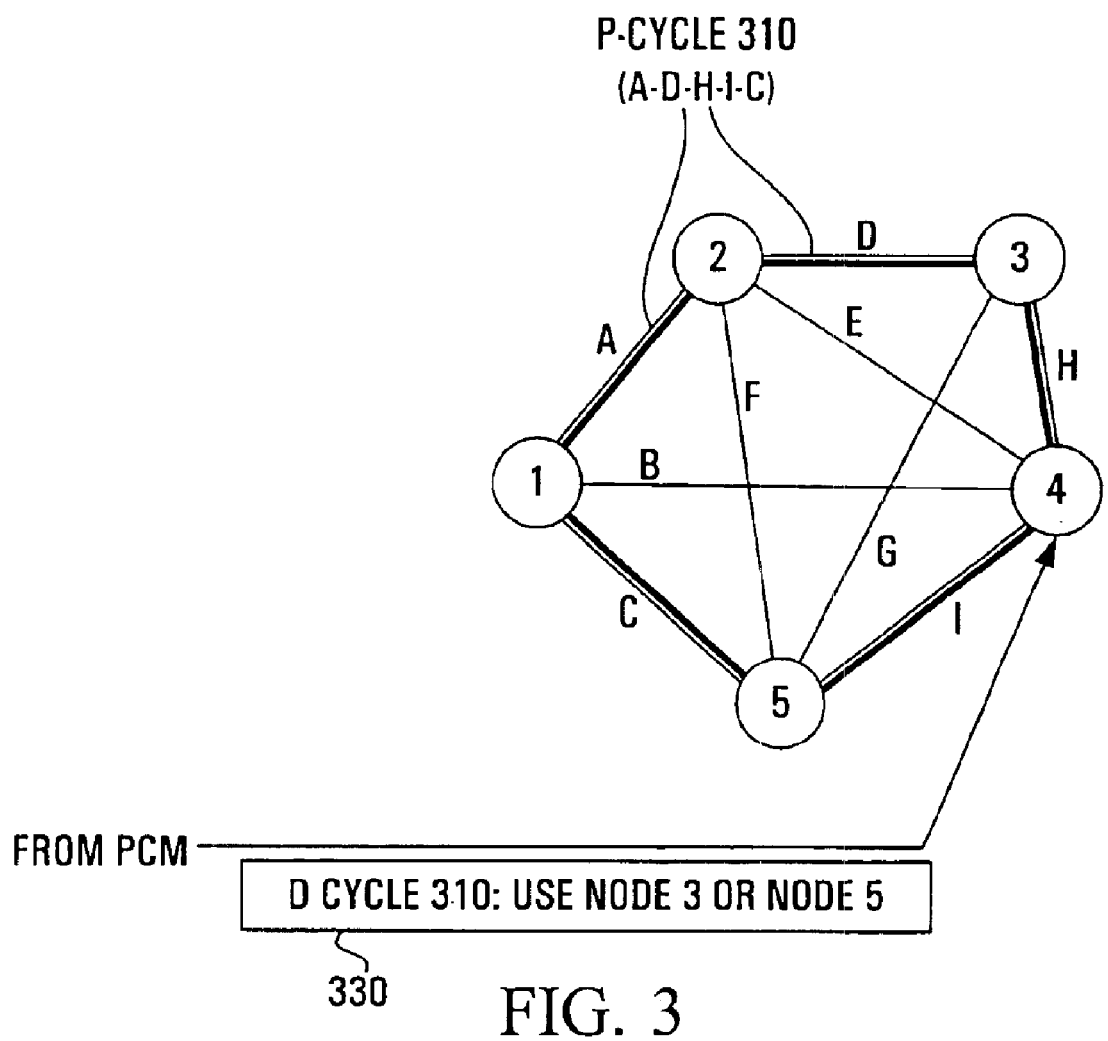
FIG. 3 shows the network of FIG. 2A which uses an Internet Protocol protection cycle to ahieve automatic protection switching, according to an embodiment of the invention.

FIG. 3 shows a p-cycle 310 defined for the network of FIG. 2A. The p-cycle 310 consists of links A, D, H, I and C, as well as nodes 1–5 within that closed path which together form a closed ring. If each link is taken to be bi-directional, as is the case here, the p-cycle 310 effectively provides two alternate routes in the event of a failure on links B, E, F and G, as well as one alternate route in the event of a failure on links A, C, D, H and I. Thus, all links A–I are protected to some degree by the p-cycle 310.

A particular link is said to be maximally protected when two or more paths can be found along a p-cycle between the end nodes of that link without including the link itself. A link is protected, but not maximally protected, when just one path can be found along some p-cycle between the end nodes of that link without including the link itself. In FIG. 2A, links B, E, F and G are maximally protected while links A, D, H, I and C are protected but not maximally protected. While maximal protection of all links is desirable, this condition is not required. All that is needed for protection of a link is that there be at least one alternate path along a p-cycle that connects the end nodes of the link.

A network protection scheme designer can make decisions concerning the selection of the links requiring protection, the selection of the protection level of a link (maximal or not maximal), the selection of the number of p-cycles to be defined in a network and the selection of the route taken by each of the p-cycles themselves. With regard to selecting the number of p-cycles and defining their individual paths through the network, some designers may find it beneficial to rely on existing methods of defining p-cycles. One such method is described in U.S. Pat. No. 5,850,505 to W. D. Grover and M. H. MacGregor, entitled "Method for Preconfiguring a Network to Withstand Anticipated Failures" and hereby incorporated by reference herein.

The computation of p-cycles using the method of U.S. Pat. No. 5,850,505 requires inputs such as the network topology as well as the loading of each link. Based on these inputs, a computer or network server or router (the "p-cycle manager"—PCM) computes a set of p-cycles for protecting traffic along a desired set of routes in the event of a link failure. Of course, it is to be understood that the method of U.S. Pat. No. 5,850,505 need not be used and that it is within the scope of the invention to employ other methods of defining a group of one or more p-cycles used to protect a set of links in the network.

Each node connected to a link that is protected by a p-cycle is made aware of the identity of the neighbouring nodes in that p-cycle. For example, referring to FIG. 3, node 4 is seen to be connected to links B, E, H and I (which are protected by p-cycle 310) and the nodes which are neighbours to node 4 within the p-cycle 310 are seen to be nodes 3 and 5. Thus, node 4 could receive a setup message 330 from the PCM identifying nodes 3 and 5 as the nodes to be used in case of failure of one of the protected links. The setup message 330 could be part of an IP datagram having a source address specifying the PCM and a destination address specifying node 4. If there is more than one p-cycle in the network, the setup message 330 received from the PCM could identify the relevant p-cycle by an alphanumeric code.

As the network topology evolves and link loading information changes, the PCM occasionally re-computes the path of each p-cycle and updates each node with any new and relevant information regarding the identity of the nodes to be used as neighbours in the event of a failure of a protected link.

Figure 4:
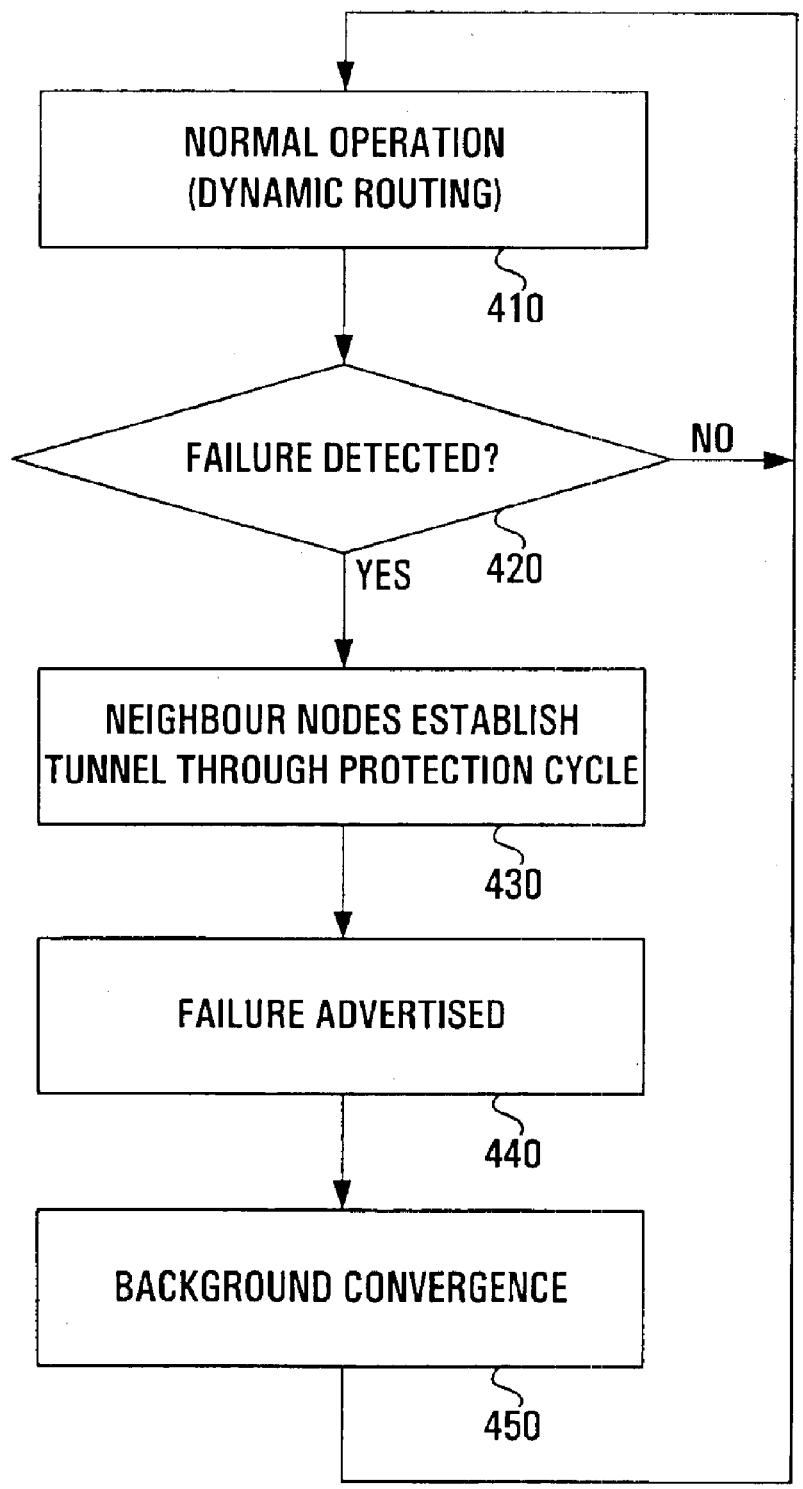
FIG. 4 is a flowchart showing high-level operation of the network of FIG. 3 in the event of a failure of a protected link, according to an embodiment of the invention.

Reference is now made to FIG. 4, which provides an overview of the steps followed by various elements of a mesh network (such as the network in FIG. 3) when the nodes are equipped with the ability to perform protection switching according to an embodiment of the invention. Firstly, STEP 410 corresponds to normal operation of the protected network, whereby the various nodes follow the routing instructions contained in their respective routing tables. Also, the PCM defines one or more p-cycles with the goal of protecting some or all of the links in the network. Moreover, by virtue of setup messages received from the PCM, each node located at the end of a protected link will know the identity of the nodes with which it must communicate in the event of a failure of the protected link.

At STEP 420, a failure of the physical layer (e.g., electrical optical) or logical layer (e.g., SONET STS or ATM VPC/VCC) protected link is detected and at STEP 430, the nodes at either end of the failed but protected link establish a "tunnel" between each other along the p-cycle associated with the failed link. A "tunnel" is a physical, logical or virtual datagram conduit established along the p-cycle and having end points which correspond to the nodes located at either end of the failed link.

For example, if the failed link is link B in FIG. 3, then a tunnel would be established between nodes 1 and 4 through the p-cycle 310. It is recalled that link B is maximally protected because there are at least two alternate paths between nodes 1 and 4, due to the links being bi-directional. Thus, the tunnel through the p-cycle 310 could run either along the "north" side via links A-D-H or along the "south" side via links C–I.

The tunnel could be an IP-in-IP tunnel, which involves the encapsulation of an entire original IP datagram within the body of a tunnel IP datagram. The header of the original datagram remains untouched and thus contains the original source and destination addresses, while the header of the tunnel datagram specifies the end nodes of the failed link in its SOURCE and DESTINATION fields.

If the link failure is a permanent one, the result will be a change in the network topology. At STEP 440, this topological change is advertised to other nodes in the network using a suitable protocol such as OSPF. The updated network topology is used by the various nodes in calculating a new set of routes. The new set of routes will, of course, exclude the failed link. The change in topology caused by the failure of a link may also have an effect on the path of the p-cycles computed by the PCM. Changes to the routes and p-cycles can be relegated to background tasks performed at STEP 450.

A diffusion-based loop prevention algorithm as is known in the art may be used to detect when the network has converged so that it is safe to switch to the new routes. Such diffusion algorithms are discussed, for example, in Garcia-Lunes-Aceves, J. J., "Loop-Free Routing Using Diffusing Computations," IEEE/ACM Transactions on Networking, vol. 1, no. 1, 1993, pp. 130–141, which is hereby incorporated herein by reference. Using p-cycles with a loop prevention algorithm allows for uninterrupted service in the event of a link failure without black holing of packets on the failed link.

By the time STEP 450 has been completed, the nodes will have finished re-computing the routing tables and, if applicable, the PCM will have finished re-computing the p-cycles. Since the new routing tables do not include the failed link as a next hop link, the tunnel previously established at STEP 430 will no longer be required and can be viewed as having been "removed" by the nodes at either end of the failed link. Thus, the tunnel can be viewed as a temporary measure which protects the failed link until that link no longer appears in any newly generated routing table.

It is seen that the use of p-cycles in a mesh network reduces the delay after which traffic begins to be protected because the time between a link failure and protection of the traffic formerly travelling along that link is governed only by the time required to detect the failure. Advantageously, this detection time may be as short as 50 milliseconds or less. Moreover, by reserving a fixed amount of bandwidth just for the p-cycle, traffic exchanged between the nodes at either end of any link protected by that p-cycle will have a delay that can be predicted ahead of time.

Figure 5:
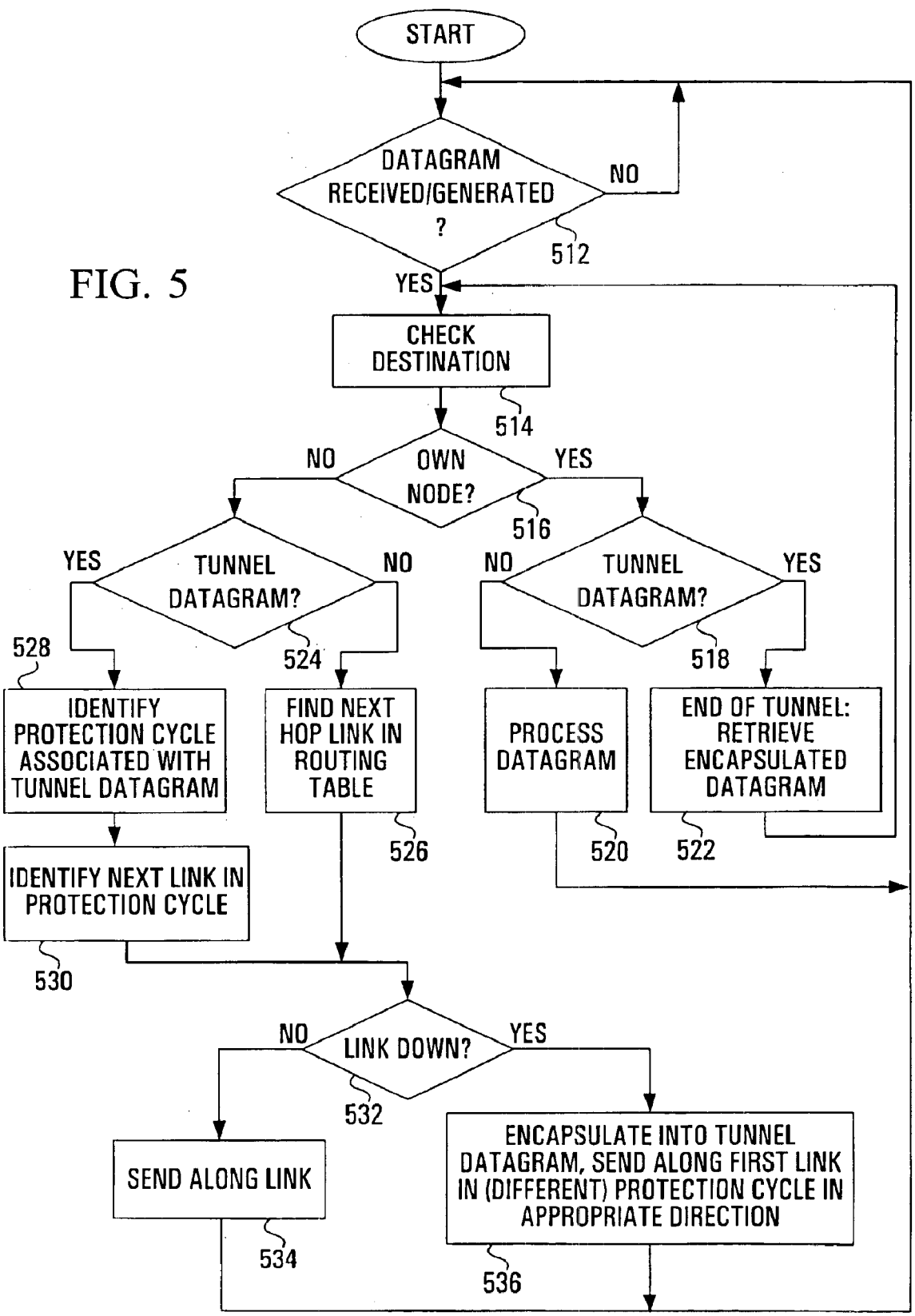
FIG. 5 is a flowchart showing operation of a node in accordance with an embodiment of the invention.

Reference is now made to FIG. 5, which shows the operational flow of an individual node forming part of a p-cycle, such as any of the nodes 1–5 in the network of FIG. 3. As per STEP 410 in FIG. 4, the node is assumed to know its designated neighbours in case of a failure of any protected link to which it is connected.

Step 512:
The node does not react until a datagram is received at the node or is generated by the node. For example, a datagram could be received from an adjacent node or it could be produced as the result of a packetization operation performed by circuitry or sofwtare within the node which accepts user data from customer premises equipment.

Step 514:
If a datagram is indeed received or generated, then the node determines the destination node associated with the datagram. This can be done by extracting and checking the addresses contained in the SOURCE and DESTINATION fields of the received or generated datagram.

Step 516:
The node verifies whether it is the destination node associated with the received or generated datagram. If so, the node proceeds to STEP 518; otherwise, the node proceeds to STEP 524.

Step 518:
The node then verifies whether the received or generated datagram destined for itself is a tunnel datagram. If not, then the node proceeds to STEP 520; otherwise, the node proceeds to STEP 522. It is recalled that the DATA_TYPE field in the header of a datagram contains information as to whether or not that datagram is a tunnel datagram.

Step 520:
Since the received or generated datagram is destined for the node in question and since the datagram is not a tunnel datagram (i.e., does not contain an encapsulated datagram in its body), the node processes the received or generated datagram. This may involve extracting user data from the body of the datagram and forwarding the user data to customer premises equipment connected to the node.

Step 522:
However, if the received or generated datagram is destined for the node in question and if the datagram is a tunnel datagram, then the node processes the tunnel datagram by retrieving the datagram encapsulated within its body. At this point, the node returns to STEP 514, where the destination of the encapsulated datagram is checked.

Step 524:
It is recalled that this step is entered when the received or generated datagram is not destined for the present node. A "received" datagram in this sense could be a datagram that is received in its present form from an adjacent node or it could be a datagram that was previously de-encapsulated by the node at STEP 522. The question now becomes whether this received or generated datagram is a tunnel datagram or not. Clearly, if the datagram has just been generated, it cannot yet be a tunnel datagram. On the other hand, if it is a received datagram, then it could possibly be a tunnel datagram. If it is not a tunnel datagram, then the node proceeds to STEP 526; otherwise, the node proceeds to STEP 528.

Step 526:
When the received or generated datagram is not a tunnel datagram, then the node locates the next hop link specified by its routing table. For this purpose, the node consults the row in the routing table which corresponds to the source-destination address pair extracted from the received datagram.

Step 528:
When the received or generated datagram is a tunnel datagram, this means that it has arrived along a p-cycle and that this p-cycle should continue to be used for forwarding the tunnel packet. If there is more than one p-cycle in the network, the appropriate p-cycle can be found by reading the DATA_TYPE field in the header of the tunnel datagram.

Step 530:
The node finds the pair of neighbours corresponding to the p-cycle identified at STEP 528. The node then identifies the neighbour node from which it received the tunnel datagram. In an IP scenario, this can be achieved by using standard route trace options. Based on this information, the node in question locates a neighbour node from which it did not receive the tunnel datagram and chooses the associated link as the next hop link. It can thus be seen that the next hop link chosen in this fashion is the next link in the p-cycle along which the tunnel datagram has arrived.

Step 532:
At this stage, the node has identified the desired link across which it intends to forward a datagram (be it an ordinary datagram or a tunnel datagram). The node now verifies the integrity of the desired link using any suitable technique. For example, a layer 1 or layer 2 fault detection mechanism could be used to monitor each link and to set an associated software flag when the link is failed. The software flag corresponding to the next hop link (identified at STEP 526 or 530) could be read by the node when the algorithm reaches STEP 532.

Step 534:
If the desired link is up running, then the datagram is forwarded along this link without further delay. The node then returns to STEP 512 where it waits for a next datagram to be received or generated.

Step 536:
However, if the desired link is in a failed state, then the node identifies a p-cycle that is capable of protecting the failed link. If the received or generated datagram is already a tunnel datagram arriving along one p-cycle, then a new p-cycle must be identified at this stage, resulting in "nested" encapsulation. The node then locates an initial link of the new p-cycle. In the case of a maximally protected link, there are two possibilities from which an initial link of the new p-cycle can be chosen.

The received or generated datagram (which could itself be a tunnel datagram in a nested scenario) is then encapsulated into the body of a tunnel datagram which is forwarded across the initial link of the new p-cycle. The header of the tunnel datagram created in this manner identifies the current node as the source node and the node at the other end of the failed link as the destination node. The header also identifies the datagram created in this manner as a tunnel datagram and specifies the p-cycle along which it is being forwarded.

Figure 6:
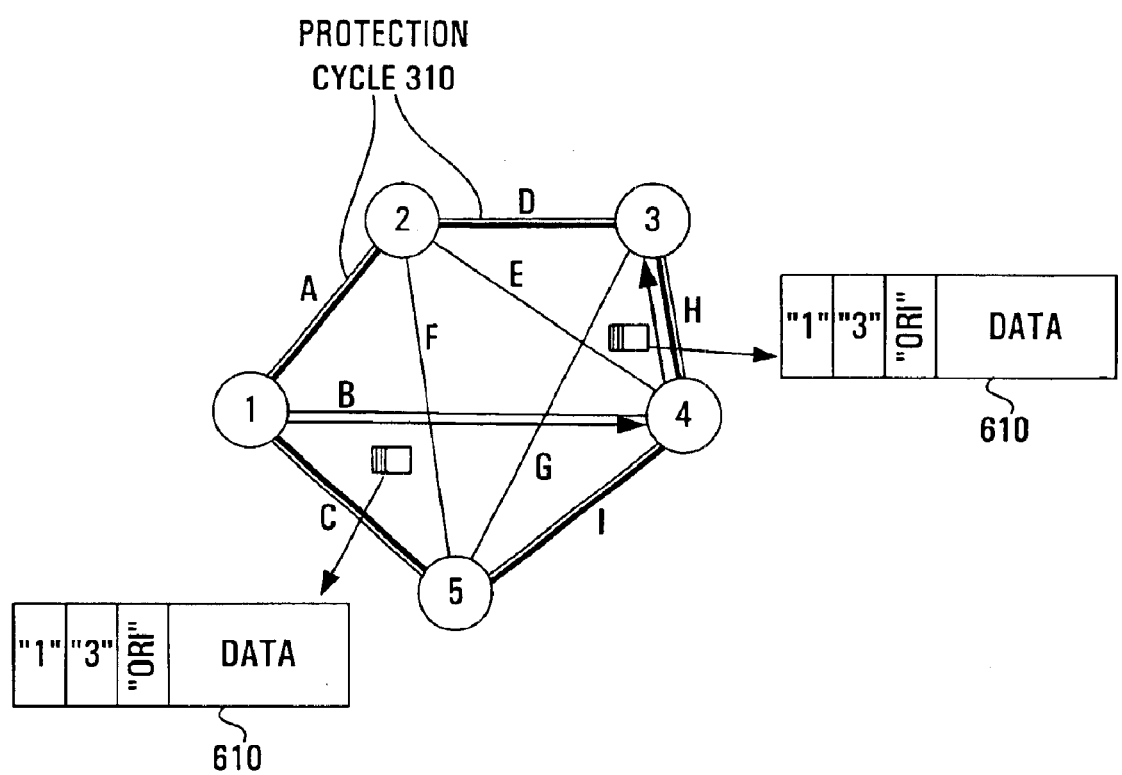
FIG. 6 shows the network of FIG. 3 during normal operation, wherein a route has been established from node 1 to node 3 via node 4.

Reference is now made to FIG. 6, which shows the state of the network of FIG. 3 during normal operation. It is seen that a single p-cycle 310 is defined as before and that links B, E, F and G are maximally protected by the p-cycle 310. In this simple example, node 1 generates a datagram 610 and forwards it to node 4. Node 4 then forwards the datagram 610 to node 3, which then processes the datagram 610. The structure of datagram 610 is based on that of datagram 1110 in FIG. 11A and consists of a header 612 and a body 614. The header 612 is seen to contain a "1" (used to denote the source node of the datagram 610), a "3" (used to denote the final destination node of the datagram 610) and an "ORI" (used to denote the absence of an encapsulated datagram from the body 614).

Figure 7A:
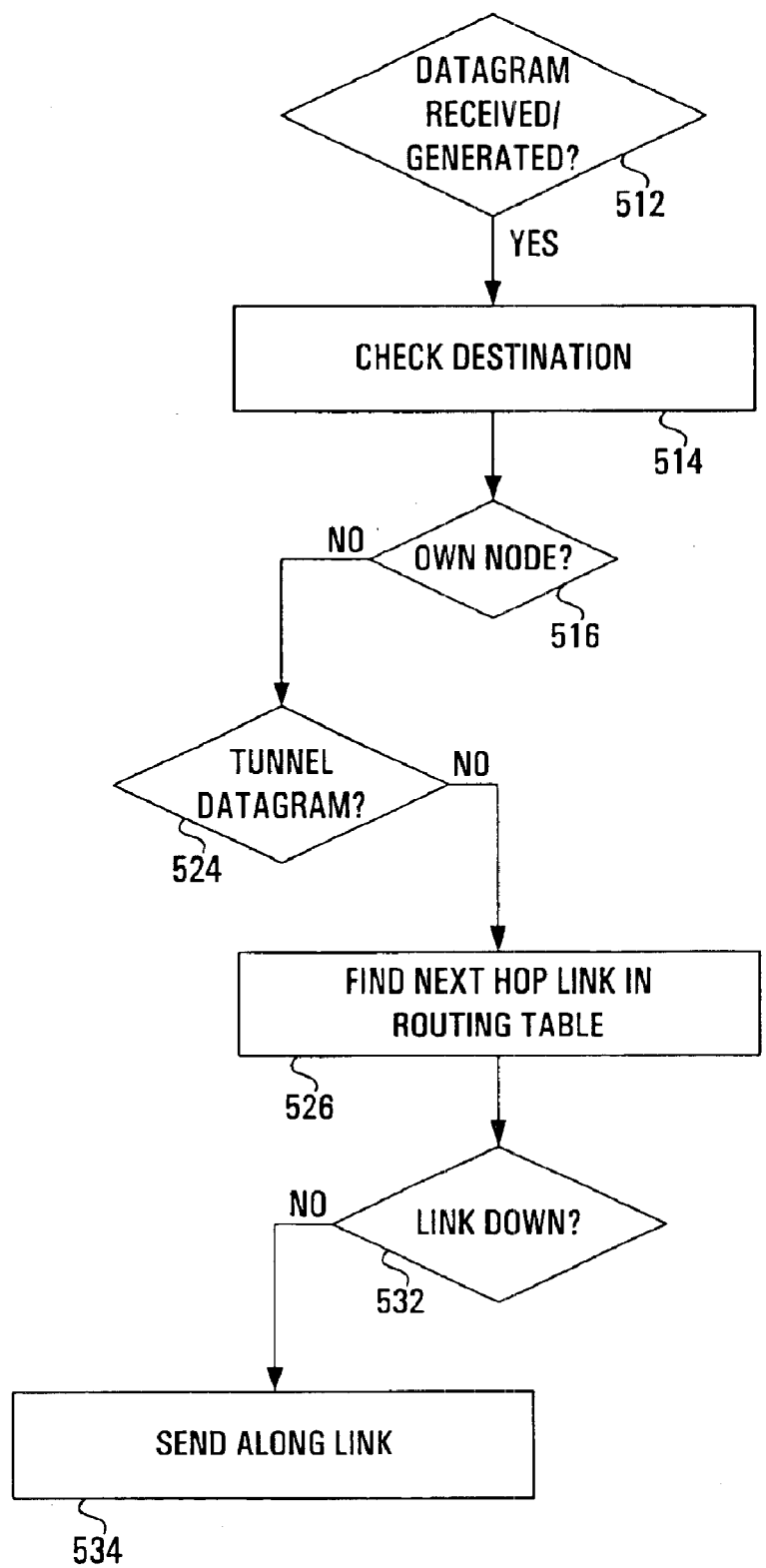
FIG. 7A shows a flowchart illustrating operation of nodes 1 and 4 in the scenario of FIG. 6.

Operation of Node 1:

With reference to FIG. 7A, there is shown the flow of node 1 upon generation of an original datagram. At STEP 512, node 1 realizes that a datagram has been generated, checks its destination at STEP 514 and, at STEP 516, determines that the destination is node 3. Upon determining, at STEP 524, that the datagram is not a tunnel datagram, node 1 proceeds to STEP 526, where it consults its routing table and finds the next link to which it is supposed to forward the datagram for the specified source-destination pair. Using the routing table of FIG. 2B, column 201 shows that the next hop link for source=1 and destination=3 as viewed by node 1 is link B. Next, at STEP 522, node 1 determines that link B is functional and subsequently forwards the datagram 610 to node 4 along link B.

Operation of Node 4:

Operation of node 4 is identical to that of node 1, except that STEP 512 is exited due to receipt of a datagram. Also, since the routing table is different for each node, the next hop link determined by node 4 when executing STEP 526 will correspond to link H.

Figure 7B:
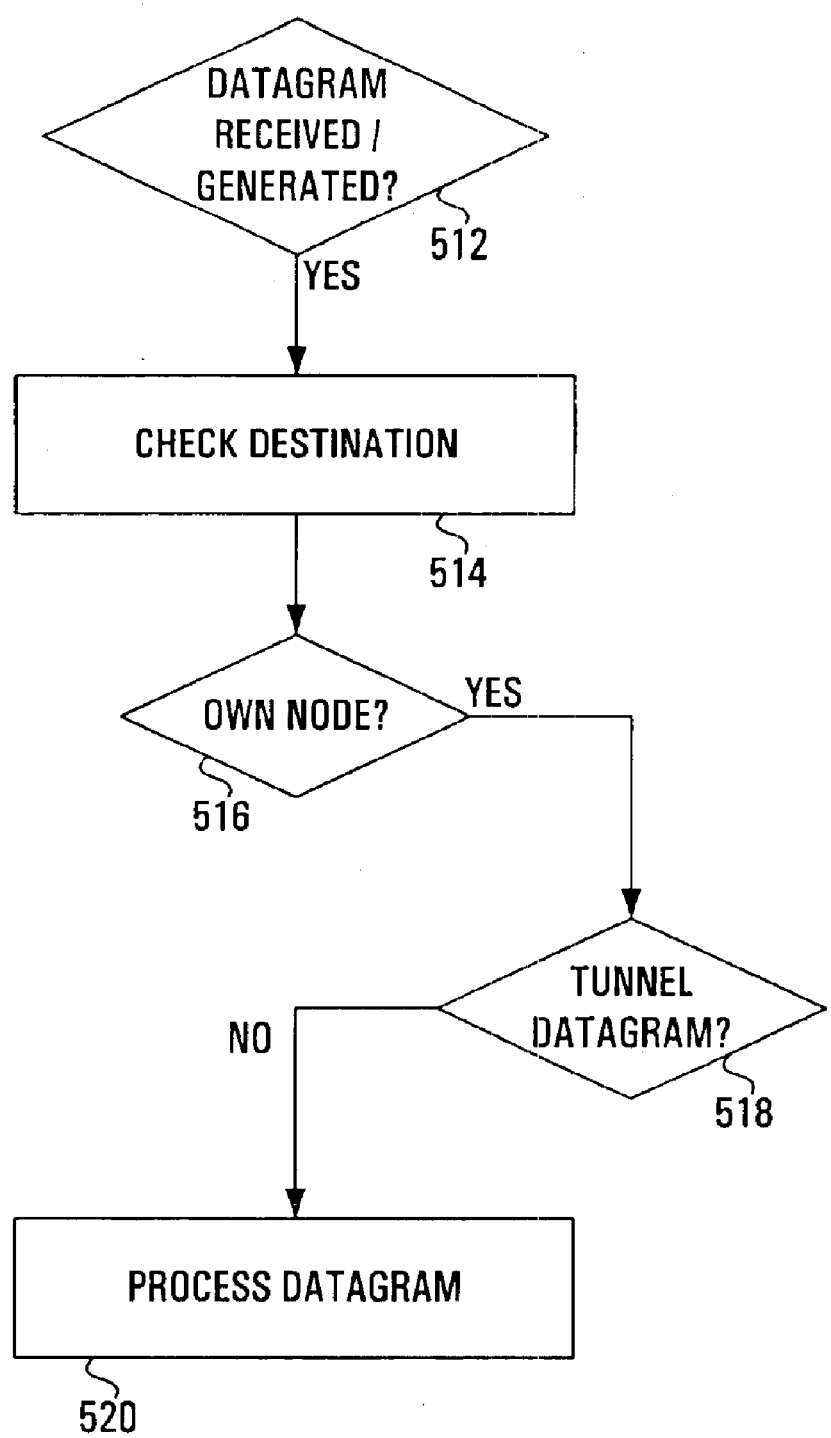
FIG. 7B shows a flowchart illustrating operation of node 3 in the scenario of FIG. 6.

Operation of Node 3:

FIG. 7B shows operation of node 3 upon receiving a datagram from node 4 in the scenario of FIG. 6. At STEP 514, node 3 checks the destination of the received datagram and, at STEP 516, realizes that node 3 is itself the destination node specified in the header of the received datagram. Thus, node 3 executes STEP 518, which consists of verifying whether the received datagram is a tunnel datagram. Since the received datagram is not a tunnel datagram, node 3 proceeds to STEP 520 where the received datagram is suitably processed. Examples of processing include extraction of the user data in the body of the datagram and forwarding of the user data to customer premises equipment. Alternatively, the entire datagram could be forwarded to a higher level segmentation and reassembly module.

Figure 8:
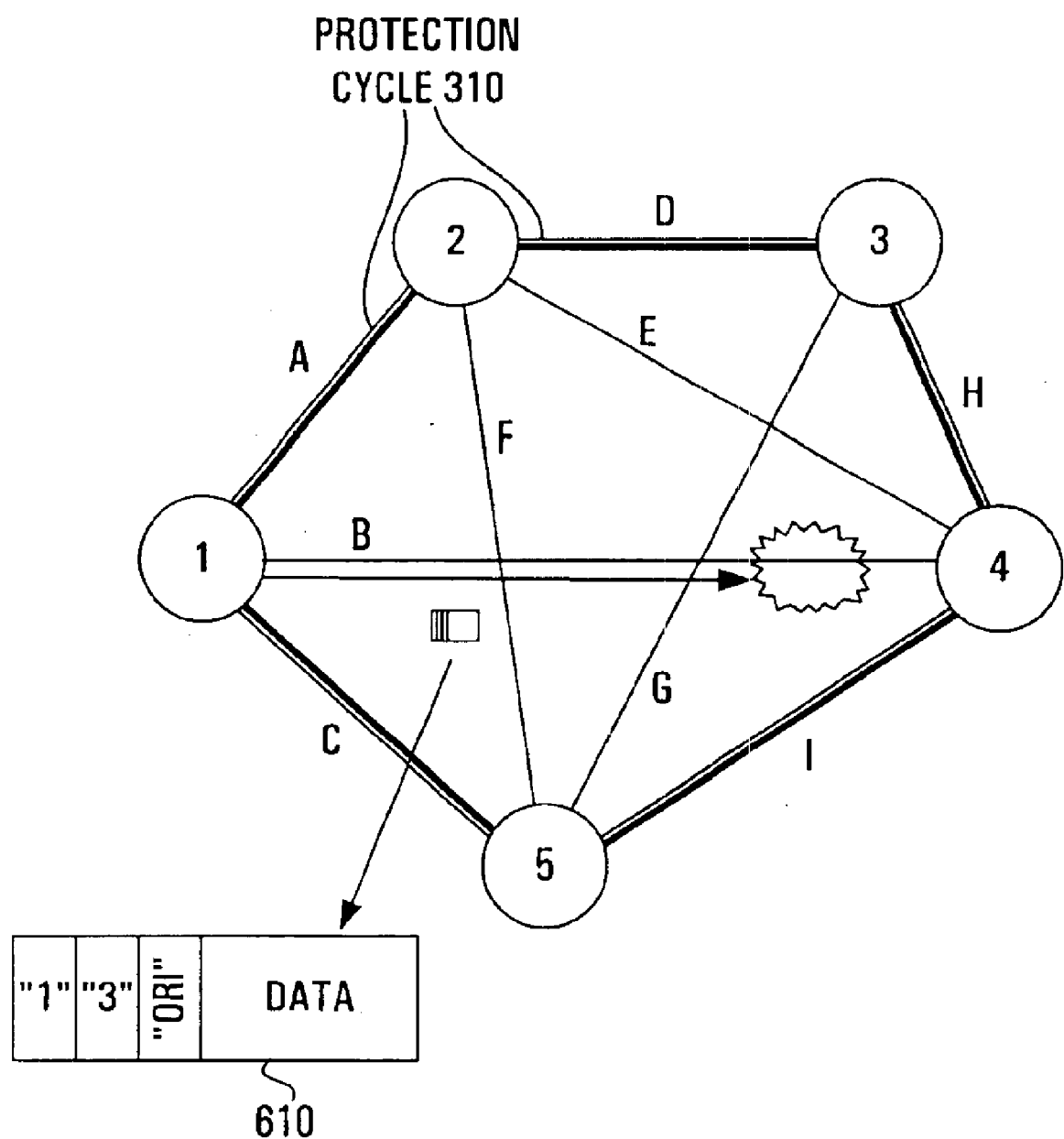
FIG. 8 shows the network of FIG. 6 immediately after a fault has occurred on link B but prior to the onset of the protection switching mechanism of the present invention.

The above description has dealt with operation of the nodes under normal conditions. Operation of the nodes under failure conditions is now described with reference to FIG. 8, wherein is depicted the occurrence of a failure along link B. It is seen that datagram 610 travelling from node 1 to node 4 along link B will be lost ("black holed") and that no datagram is forwarded by node 4 to node 5 along link H. According to an embodiment of the invention, nodes 1 and 4 respond to the failure by establishing a tunnel through the p-cycle 310.

Figure 9:
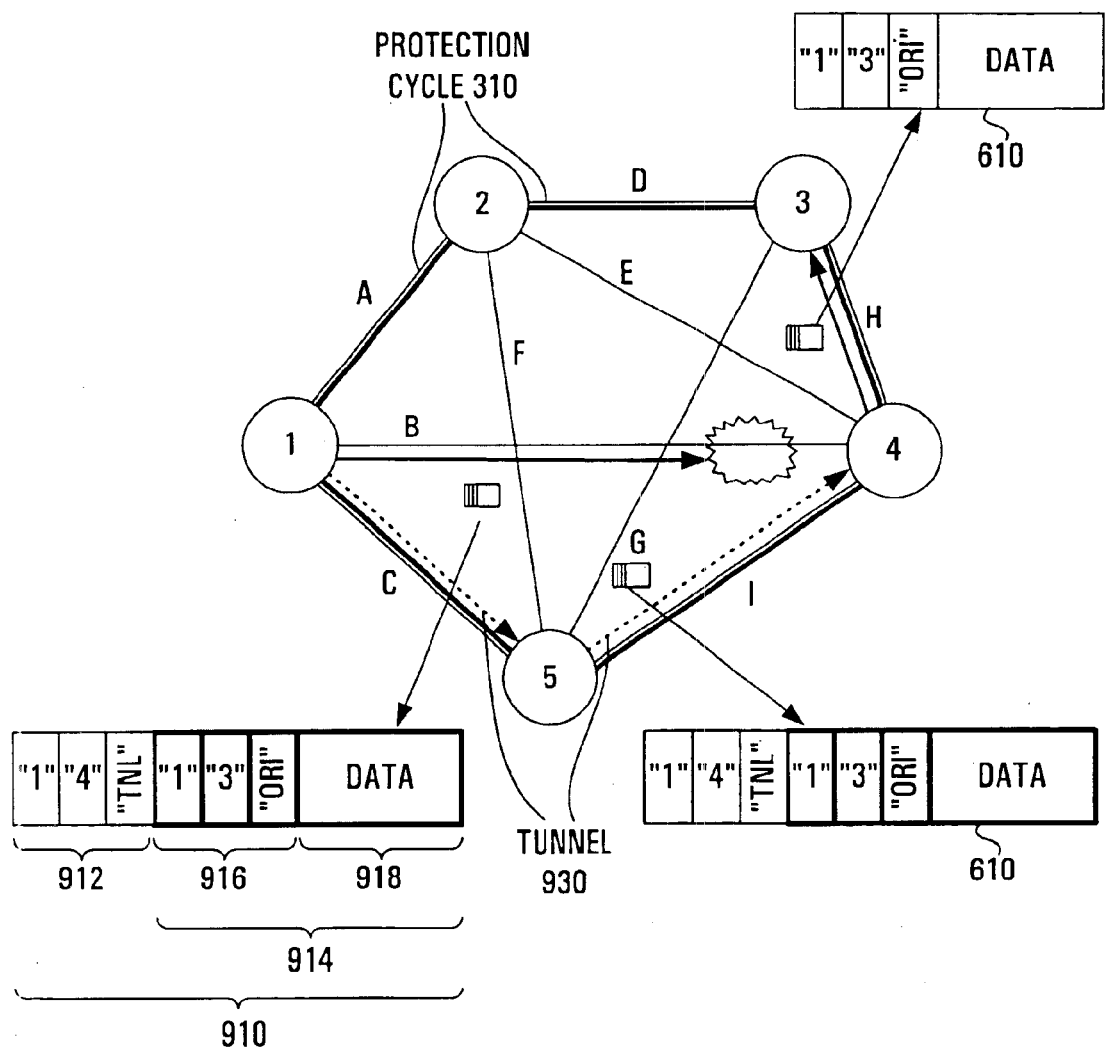
FIG. 9 shows the network of FIG. 8 during protection operation, wherein a tunnel is been established from node 1 to node 4 via node 5.

FIG. 9 shows the establishment of a tunnel involving nodes 1 and 4. Each datagram 910 issued by node 1 is a tunnel datagram and has a header 912 and a body 914. The header 912 specifies node 1 as the source and node 4 as the destination. That is, the source and destination nodes are the nodes at the ends of the failed link which, in this case, is link B. The header 912 also specifies (by the code "TNL") that the datagram 910 is a tunnel datagram. The identity of the p-cycle to be used could also be specified in the header 912. In this case, it is not necessary to explicitly identify a desired p-cycle because only one p-cycle 310 has been defined.

The body 914 of the tunnel datagram 910 encapsulates a complete datagram having its own header 916 and its own body 918. The header 916 of the encapsulated datagram 914 contains the exact same header information as datagram 610. The body 918 of the encapsulated datagram 914 contains user data and therefore its contents will vary from one datagram to the next. Clearly, the tunnel datagram 910 will be bigger than the encapsulated datagram 914 if the latter is encapsulated in its entirety. If desired, the body 918 of the encapsulated datagram 914 could be distributed among more than one tunnel datagram 910.

Figure 10A:
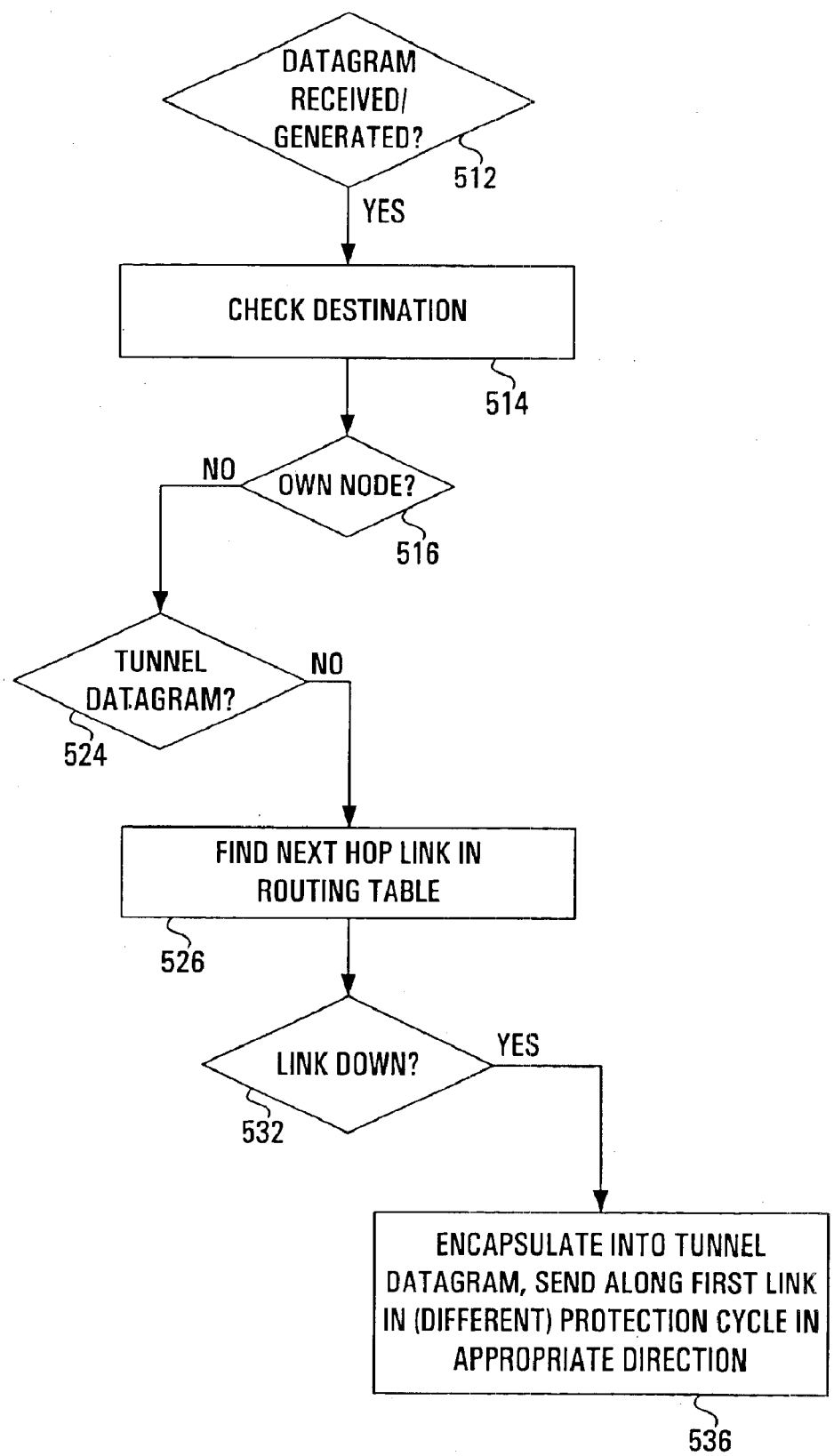
FIG. 10A is a flowchart illustrating operation of node 1 in the scenario of FIG. 9.

Operation of Node 1:

FIG. 10A shows operation of node 1 when establishing a tunnel according to an embodiment of the invention. Node 1 generates an original datagram, such as datagram 610, which causes STEP 512 to be exited through the "Y" path, leading to STEP 514. At STEPS 514 and 516, the destination of the generated datagram is found to be node 4, leading to STEP 524. At STEP 524, node 1 is not yet dealing with a tunnel datagram. Thus, node 1 proceeds to STEP 526 where the next hop link is found from the routing table. Column 201 in FIG. 2B indicates that the next hop link is node B. However, at STEP 528, node 1 realizes that link B is down and executes STEP 536.

Specifically, node 1 encapsulates the entire original datagram into the body of a tunnel datagram. The header of the tunnel datagram is given a source node of 1 and a destination node of 4. Also, node 1 determines that p-cycle 310 is to be used and selects one of the two possible directions across the p-cycle 310. In this case, the "south" direction was chosen but it would be equally suitable to select the "north" direction. Node 1 then fills the DATA_TYPE field in the header of the tunnel datagram with a code that identifies the datagram as a tunnel datagram. Node 1 may also add to the DATA_TYPE field a code specifying the identity of the p-cycle used, although this action is not necessary when there is only one p-cycle defined as is the case here. Node 1 then forwards the tunnel datagram created in this way to node 5 along link C.

Figure 10B:
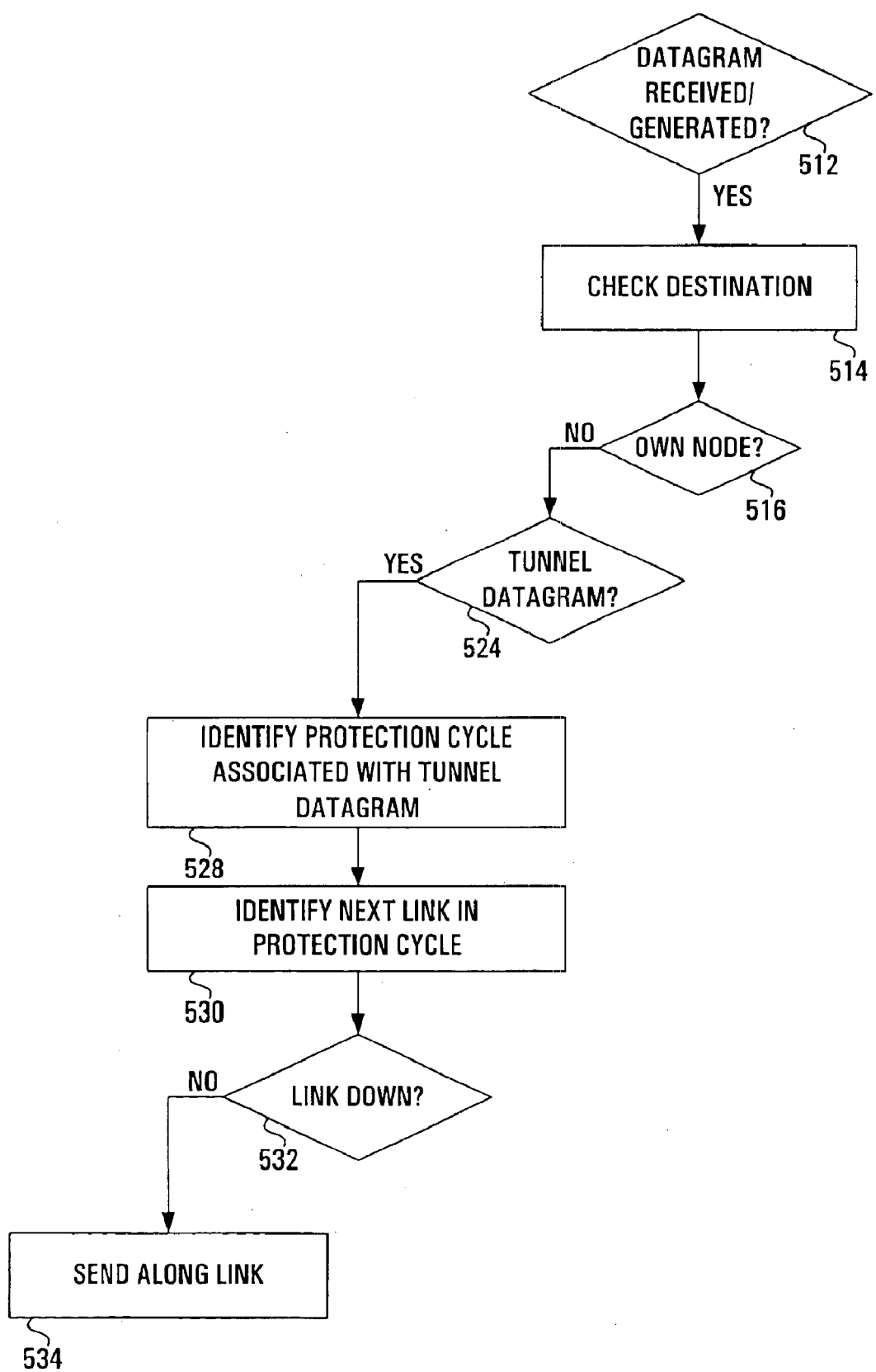
FIG. 10B is a flowchart illustrating operation of node 5 in the scenario of FIG. 9.

Operation of Node 5:

FIG. 10B shows operation of node 5 upon receipt of a tunnel datagram from node 1, although node 5 does not know at the outset that it is the recipient of a tunnel datagram. Firstly, receipt of the datagram triggers execution of STEP 514 followed by STEP 516. At STEP 516, node 5 determines that it is not the destination node of the received datagram. Thus, node 5 proceeds to STEP 524, where it reads the header of the received datagram and determines that it has received a tunnel datagram. Receipt of a tunnel datagram signifies usage of a p-cycle. At STEP 528, node 5 identifies the p-cycle associated with the tunnel datagram. In cases where the p-cycle in use is identified in the header of the tunnel datagram, this can be done by extracting the identity of the p-cycle from the header of the tunnel datagram. At STEP 530, node 5 identifies the next hop link in the p-cycle. In this case, node 5 realizes that it has received the tunnel datagram from node 1 and therefore it concludes that the next hop link in the p-cycle 310 must be link I. At STEP 532, node 5 confirms that link I is operational and forwards the received tunnel datagram, unchanged, to node 4 along link I.

Figure 10C:
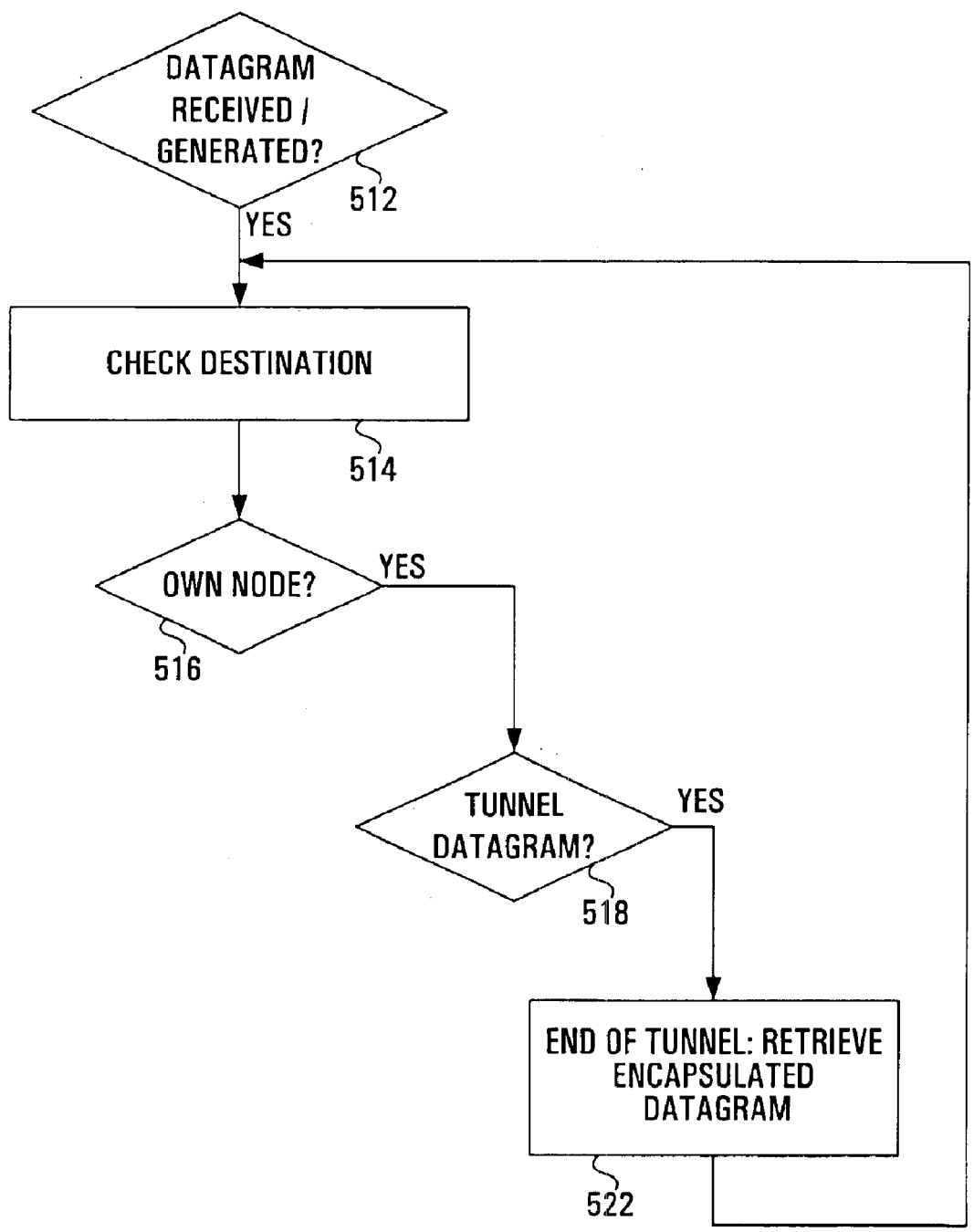
FIGS. 10C and 10D are flowcharts illustrating operation of node 4 in the scenario of FIG. 9.
Figure 10D:
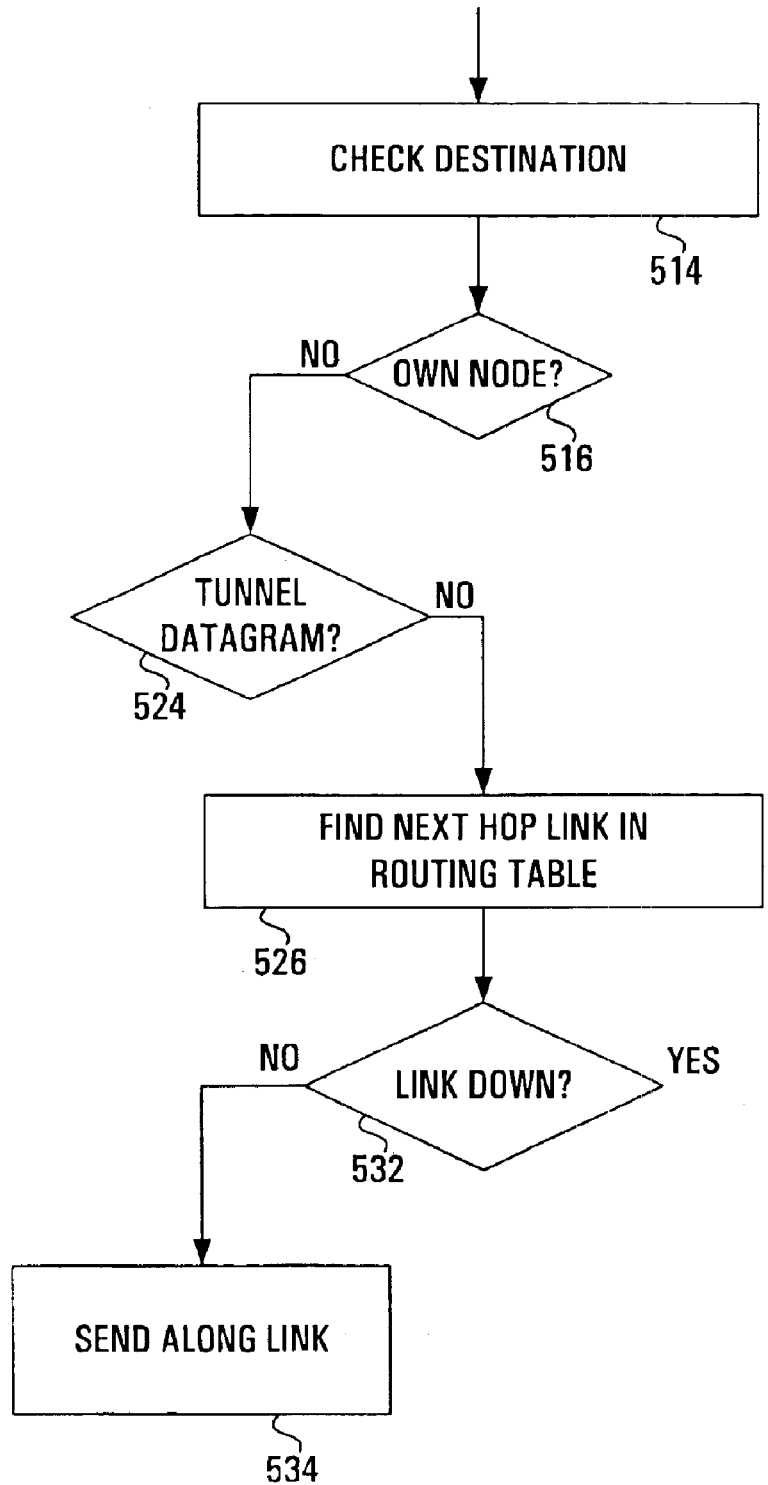

Operation of Node 4:

FIGS. 10C and 10D show the operational flow of node 4 upon receipt of a tunnel datagram from node 5. In FIG. 10C, receipt of a datagram triggers the execution of STEPS 514 and 516 in the usual way. At STEP 516, node 4 determines that it is the destination node associated with the received datagram and therefore proceeds to STEP 518, where node 4 determines that the received datagram is a tunnel datagram. This information, coupled with the fact that the received datagram is destined for node 4 itself, means that node 4 should execute STEP 522, where it extracts the datagram encapsulated in the body of the received tunnel datagram. The encapsulated datagram has the original form of datagram 610 previously described with reference to FIG. 7.

Node 4 then returns to STEP 514, where node 4 checks the destination of the encapsulated datagram. Since the encapsulated datagram is actually destined for node 3, the next step is STEP 524, where node 4 further determines that the encapsulated datagram is in original form (i.e., is not a tunnel diagram). Thus, node 4 continues with STEP 526, where it consults its routing table to determine the next hop link associated with the source-destination pair specified in the header of the encapsulated datagram. As seen in column 204 of FIG. 2B, the next hop link associated with source=1 and destination=3 is link H. Thus, node 4 checks the integrity of link H at STEP 526 and, since link H is operable, node 4 forwards the original datagram to node 3 across link H.

Operation of Node 3:

The behaviour of node 3 remains unchanged from that previously described with reference to FIG. 7B. Thus, node 3 checks the destination of the received datagram and realizes that node 3 itself is the destination node as specified in the header. Thus, it verifies whether the received datagram is a tunnel datagram. Since the received datagram is not a tunnel datagram, node 3 processes the received datagram.

The above description has shown how traffic normally destined to travel on link B is protected by establishing a tunnel within the p-cycle 310. Following the occurrence of the failure on link B, the delay with which packets or datagrams are re-routed via the p-cycle 310 is dependent only on the detection time, which is in the millisecond range when performed at the physical or virtual layer. Advantageously, no hold-down time is required, resulting in fast protection switching of mission-critical traffic.

Another feature of the present invention is that if a certain amount of bandwidth on the p-cycle is reserved during normal operation, any traffic having up to and including that amount of bandwidth can be rerouted from one of the links protected by that p-cycle. Consequently, it is possible to guarantee that mission-critical traffic will be supported through the network without having to reserve additional bandwidth on every single link. This has advantages in terms of reducing the required capacity of the network, resulting in reduced equipment costs.

A further advantage of the invention stems from the simplicity with which the automatic protection switching algorithm is executed by the nodes. That is to say, only those nodes located at the ends of a failed link establish a tunnel. The nodes along the p-cycle between the two end nodes simply need to identify whether or not a received packet is a tunnel packet prior to making a routing decision. This small amount of overhead should not slow down the usual operation of the nodes in any significant way.

Those skilled in the art should also appreciate that the present invention applies not just to link failures per se, but also to failed ingress or egress ports at an interface card on a node. Nodes can easily be programmed to detect such failures, which have an effect identical to that of a link failure.

Moreover, it is within the scope of the invention to handle multiple link failures. For example, a tunnel may be established through a link belonging to a first p-cycle. If that link fails but is protected by a second p-cycle, then another tunnel is established through the second p-cycle. This situation results in nested encapsulation of a datagram. Any number of encapsulation layers is within the scope of the invention.

In the case of a twice encapsulated datagram, upon its arrival at the end of the tunnel established along the second p-cycle, the datagram extracted from the first layer of encapsulation (at STEP 522 of the algorithm in FIG. 5) would itself be a tunnel datagram. Of course, nothing prevents the node in question from simultaneously being (1) the destination of the received tunnel datagram, (2) the destination of the encapsulated tunnel datagram and (3) the destination of the original datagram itself.

Some embodiments of the invention, or portions thereof, may be implemented in any conventional computer programming language. For example, preferred embodiments may be implemented in a procedural programming language (e.g., "C") or an object oriented programming language (e.g., "C++" or "JAVA"). Alternative embodiments of the invention may be implemented as pre-programmed hardware elements (e.g., application specific integrated circuits), or other related components.

Other embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

We claim:

1. A method of routing packets intended to be transmitted across a network link protected by a protection path defined by a closed loop of nodes and links through the network, the method comprising the steps of:

determining whether the protected link has failed; and if the protected link has not failed, sending the packets across the protected link; otherwise, encapsulating the packets within tunnel packets and sending the tunnel packets along the protection path; and wherein each packet comprises a header specifying the identity of a source node and a destination node associated with the packet and the source and destination nodes associated with each tunnel packet correspond to the nodes at either end of the protected link.

2. A method as claimed in claim 1, wherein the header of each packet further specifies the nature of the packet as a tunnel packet or a non-tunnel packet.

3. A method as claimed in claim 2, wherein the header of each tunnel packet specifies the identity of the protection path along which it is sent.

4. A method as claimed in claim 3, wherein each tunnel packet further comprises a body and wherein the packet encapsulated by a tunnel packet is contained in the body of the tunnel packet.

5. A method as claimed in claim 4, wherein the encapsulated packet is itself a tunnel packet.

6. A method as claimed in claim 1, wherein the step of determining whether the protected link has failed is performed at a physical electrical layer.

7. A method as claimed in claim 1, wherein the step of determining whether the protected link has failed is performed at a physical optical layer.

8. A method as claimed in claim 1, wherein the step of determining whether the protected link has failed is perform at a logical layer.

9. A method as claimed in claim 8, wherein the logical layer is a SONET STS path.

10. A method as claimed in claim 8, wherein the logical layer is an ATM VCC or VPC.

11. A method as claimed in claim 1, wherein all packets are Internet protocol (IP) datagrams.

12. A method as claimed in claim 1, wherein the trajectory of the protection path is updated dynamically.

13. A method of routing packets received along a network link by a node, each said received packet being associated with a source node and a destination node, the method comprising the steps of:

determining the destination node associated with each received packet;

determining whether the received packet is a tunnel packet encapsulating another packet within its body; and if the destination node associated with the received packet is the current node and if the received packet is not a tunnel packet, processing the received packet without further forwarding;

if the destination node associated with the received packet is not the current node and if the received packet is not a tunnel packet, forwarding the received packet based on the destination node associated with the received packet;

if the destination node associated with the received packet is the current node and if the received packet is a tunnel packet, retrieving the encapsulated packet from the received packet and forwarding it based on the destination node associated with the encapsulated packet;

if the destination node associated with the received packet is not the current node and if the received packet is a tunnel packet, determining the identity of a protection path along which the tunnel packet was received and forwarding the received packet along a next link in that protection path.

14. A method as claimed in claim 13, wherein any step which involves forwarding a packet across a link protected by a protection path comprises:

determining whether the protected link has failed; and if the protected link has not failed, sending the packet across the protected link; otherwise, encapsulating the packet within a tunnel packet and sending the tunnel packet along the protection path.

15. A method as claimed in claim 14, wherein each packet comprises a header specifying the identity of a source node and a destination node associated with the packet.

16. A method as claimed in claim 15, wherein the ource and destination nodes associated with each tunnel packet correspond to the nodes at either end of the protected link.

17. A method as claimed in claim 15, wherein the header of each packet further specifies the nature of the packet as a tunnel packet or a non-tunnel packet.

18. A method as claimed in claim 17, wherein the header of each tunnel packet specifies the identity of the protection path along which it is sent.

19. A method as claimed in claim 14, wherein all packets are Internet protocol (IP) datagrams.

20. A method of switching traffic in a packet-switched network having a plurality of nodes interconnected by links, the method comprising the steps of:

upon detection of a failure of a link connected a pair of adjacent nodes, encapsulating packets within the bodies of tunnel packets and forwarding the tunnel packets along a predefined protection path which bypasses the failed link, including upon receipt of a tunnel packet by one of the adjacent nodes along a protection path, the recipient node retrieving the encapsulated packet and routing it as a function of a destination specified in the header of the encapsulated packet.

21. A method as claimed in claim 20, wherein each packet comprises a header specifying the identity of a source node and a destination node associated with the packet.

22. A method as claimed in claim 21, wherein the source and destination nodes associated with each tunnel packet correspond to the nodes at either end of the protected link.

23. A method as claimed in claim 21, wherein the header of each packet further specifies the nature of the packet as a tunnel packet or a non-tunnel packet.

24. A method as claimed in claim 23, wherein the header of each tunnel packet specifies the identity of the protection path along which it is sent.

25. A method as claimed in claim 22, wherein all packets are Internet protocol (IP) datagrams.

26. A packet-switched network comprising a plurality of nodes interconnected by links, wherein pre-defined protection paths provide protection of a selected plurality of links and wherein adjacent nodes connected by a protected link are adapted to detect a failure of the protected link, to encapsulate packets within tunnel packets, to differentiate between tunnel packets and non-tunnel packets and to exchange the tunnel packets via the protection paths; and wherein each packet comprises a header specifying the identity of a source node and a destination node associated with the packet and wherein the source and destination nodes associated with each tunnel packet correspond to the nodes at either end of the protected link.

27. A packet-switched network as claimed in claim 26, wherein the header of each packet further specifies the nature of the packet as a tunnel packet or a non-tunnel packet.

28. A packet-switched network as claimed in claim 27, wherein the header of each tunnel packet specifies the identity of the protection path along which it is sent.

29. A packet-switched network as claimed in claim 26, wherein all packets are Internet protocol (IP) datagrams.

30. A data router for routing packets intended to be transacted across a network link protected by a protection path defined by a closed loop of nodes and links through the network, comprising;
   a data interface for packets to enter and exit the router;
   a protection cycle packet manager connected to the data interface, for:
   i. determining whether the protected link has failed;
   ii. sending the packets across the protected link if the protected link has not failed; and
   iii. encapsulating the packets within tunnel packets and sending the tunnel packets along the protection path if the protected link has failed; and
   a packeter that converts, in response to failure of a link, affected data packets muted over the failed link into protection cycle packets in the specific protection format.

31. A data router as claimed in claim 30, wherein the protection cycle manager further advertises a link failure to the network using a routing protocol.

32. A data router as claimed in claim 30, wherein the specific protection cycle format includes a label stack based on Multi-Protocol Label Switching (MPLS).

33. A data router as claimed in claim 32, wherein the label stack includes labels for the packet source and the packet destination.

34. A data router as claimed in claim 30, wherein the specific protection cycle format includes an IP-in-EP tunnel.

35. A data router as claimed in claim 30, wherein the IP-in-IP tunnel includes a header containing the packet source and the packet destination and an indication that the packet is a protection cycle packet.

36. A data router as claimed in claim 30, the protection cycle packet manager being adapted to determine the destination node associated with each received packet, to determine whether the received packet is a tunnel packet encapsulating another packet within its body and to
   i. process the received packet without further forwarding, if the destination node associated with the received packet is the current node and if the received packet is not a tunnel packet;
   ii. forward the received packet based on the destination node associated with the received packet, if the destination node associated with the received packet is not the current node and if the received packet is not a tunnel packet;
   iii. retrieve an encapsulated packet from the received packet and forward it based on the destination node associated with the encapsulated packet, if the destination node associated with the received packet is the current node and if the received packet is a tunnel packet; and
   iv. determine the identity of a protection path along which the received packet was received and forward the received packet along a next link in that protection path, if the destination node associated with the received packet is not the current node and if the received packet is a tunnel packet.

* * * * *